(12) United States Patent
Ushirosako et al.

(10) Patent No.: US 10,267,530 B2
(45) Date of Patent: Apr. 23, 2019

(54) AIR CONDITIONER CONTROL SYSTEM, CONNECTING DEVICE, AND AIR CONDITIONER CONTROL METHOD

(71) Applicant: Mitsubishi Electric Corporation, Tokyo (JP)

(72) Inventors: Hiroaki Ushirosako, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 15/511,765

(22) PCT Filed: Oct. 14, 2014

(86) PCT No.: PCT/JP2014/077332
§ 371 (c)(1),
(2) Date: Mar. 16, 2017

(87) PCT Pub. No.: WO2010/059671
PCT Pub. Date: Apr. 21, 2016

(65) Prior Publication Data
US 2017/0292728 A1    Oct. 12, 2017

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *F24F 11/83* (2018.01);
(Continued)

(58) Field of Classification Search
CPC .. F24F 11/30; F24F 11/62; F24F 11/83; F24F 11/89; F24F 11/63; F24F 11/85;
(Continued)

(56) References Cited

U.S. PATENT DOCUMENTS

| | | | |
|---|---|---|---|
| 2010/0023168 A1* | 1/2010 | Kai | F24F 11/30 700/278 |
| 2010/0218527 A1* | 9/2010 | Kitagishi | F25B 49/025 62/228.5 |
| 2012/0273581 A1* | 11/2012 | Kolk | G05D 23/1905 236/91 D |

FOREIGN PATENT DOCUMENTS

| | | |
|---|---|---|
| JP | 59-50025 B2 | 12/1984 |
| JP | 61-16900 B2 | 5/1986 |

(Continued)

OTHER PUBLICATIONS

International Search Report of the International Searching Authority dated Jan. 20, 2015 for the corresponding International application No. PCT/JP2014/077332 (and English translation).

*Primary Examiner* — Kenneth M Lo
*Assistant Examiner* — Michael W Choi
(74) *Attorney, Agent, or Firm* — Posz Law Group, PLC

(57) ABSTRACT

An air conditioner performs air conditioning on the basis of an intake temperature and a first set temperature. An air conditioning control device includes a controller that switches between an ON state and an OFF state of a signal output on the basis of an indoor temperature and the set temperature. A temperature measuring device measures the indoor temperature. A connecting device estimates a user set temperature based on the ON-OFF state of the signal output of the air conditioning control device and the indoor temperature acquired from the temperature measuring device, calculates a second set temperature on the basis of an intake temperature acquired from the air conditioner and an indoor temperature difference between the estimated set temperature and the indoor temperature, and transmits the calculated set temperature to the indoor unit. The air conditioner updates the stored set temperature to the set temperature received from the connecting device.

19 Claims, 21 Drawing Sheets

(51) Int. Cl.
*F24F 11/83* (2018.01)
*G05D 23/19* (2006.01)
*F24F 11/63* (2018.01)
*F24F 11/85* (2018.01)
*F24F 11/46* (2018.01)
*F24F 110/10* (2018.01)

(52) U.S. Cl.
CPC .......... *G05D 23/1932* (2013.01); *F24F 11/46* (2018.01); *F24F 11/63* (2018.01); *F24F 11/85* (2018.01); *F24F 2110/10* (2018.01); *G05B 2219/2614* (2013.01)

(58) Field of Classification Search
CPC ..... F24F 11/46; F24F 2110/10; G05B 19/048; G05B 2219/2614; G05D 23/1932
USPC ........................................................ 700/278
See application file for complete search history.

(56) References Cited

FOREIGN PATENT DOCUMENTS

| | | |
|---|---|---|
| JP | 2006-275460 A | 10/2006 |
| JP | 2008-101897 A | 5/2008 |
| JP | 2009-210217 A | 9/2009 |
| JP | 5157532 B2 | 12/2012 |

\* cited by examiner

AIR CONDITIONER CONTROL SYSTEM, CONNECTING DEVICE, AND AIR CONDITIONER CONTROL METHOD

CROSS REFERENCE TO RELATED APPLICATION

This application is a U.S. national stage application of International Patent Application No. PCT/JP2014/077332 filed on Oct. 14, 2014, the disclosure of which is incorporated herein by reference.

TECHNICAL FIELD

The present disclosure relates to an air conditioner control system, a connecting device, and an air conditioner control method.

BACKGROUND ART

Generally air conditioners and air conditioning-related devices of homes, buildings, and the like in North America conventionally use a thermostat, that is, an air conditioning control device. The expression "air conditioning-related devices", for example, includes devices such as auxiliary heat sources and fans. The thermostat has a temperature setting function, performs ON/OFF control of power supply to the air conditioner or air conditioning-related device in accordance with a set temperature and a temperature measured by the thermostat (temperature measurer), and controls operation of the air conditioner or air conditioning-related device. In recent years thermostats are marketed that display information such as an operating time and air conditioner power consumption, or that store the daily operating times of the air conditioner and automatically set an operating schedule of the air conditioner in accordance with the stored daily operating times. Further, standardization of the wiring format of thermostats guarantees interchangeability among the thermostats of different manufacturers.

Further, air conditioners marketed in recent years include an inverter circuit, and such air conditioners can use the inverter circuit to adjust rotation speed of a compressor in response to a temperature difference between indoor temperature and the set temperature. By use of the air conditioner that includes the inverter circuit, the rotation speed of the compressor can be appropriately adjusted in response to the temperature difference between the indoor temperature and the set temperature. Specifically, when using this type of air conditioner, the rotation speed of the compressor is decreased as the temperature difference between the indoor temperature and the set temperature decreases. Such operation can decrease fluctuation range of the indoor temperature. Further, rotation speed of the compressor can be maintained at a required minimum limit by raising and lowering the rotation speed of the compressor in response to the temperature difference between the indoor temperature and the set temperature, and thus such operation can lower power consumption by the air conditioner accordingly.

The thermostat, in the aforementioned manner, transmits to the air conditioner only information indicating whether to turn ON or OFF the power supply. Thus when using the air conditioner that includes the inverter circuit, control by appropriate adjustment of rotation speed of the compressor in reaction to the temperature difference between the indoor temperature and the set temperature is not possible, and the power consumption by the air conditioner and fluctuation rate of the indoor temperature are not sufficiently reduced.

In contrast, a mediating device is proposed, as in Patent Literature 1, that mediates between the thermostat and the air conditioner that includes the inverter. This mediating device, upon detection of a change of output of the thermostat, determines the set temperature of the air conditioner on the basis of an intake temperature measured by the air conditioner. Specifically, the mediating device calculates an mean value of the intake temperature obtained when the output of the thermostat changes from ON to OFF and the intake temperature obtained when the output of the thermostat changes from OFF to ON, and the mediating device uses the calculated mean value as an air conditioning target temperature value. Then the mediating device transmits the calculated air conditioning target temperature value to the air conditioner. The air conditioner adjusts rotation speed of the compressor in a step-wise manner such that the intake temperature measured by an intake temperature sensor becomes the air conditioning target temperature value received from the mediating device.

CITATION LIST

Patent Literature

Patent Literature 1: Japanese Patent No. 5157532

SUMMARY OF INVENTION

Technical Problem

However, an air conditioning method is known that installs a single air conditioner at a location such as below a floor, above a ceiling, or outdoors, and that sends air from the single air conditioner to each room through ducts. When this type of air conditioning method is used, indoor temperature of a room in which the thermostat is installed may differ greatly from air temperature in the vicinity of the location where the air conditioner is installed. In this case, efficiently causing the indoor temperature to converge on the set temperature is difficult when using technology, such as that of the mediating device disclosed in Patent Literature 1, that determines the set temperature of the air conditioner on the basis of the intake temperature measured by the air conditioner.

In consideration of the aforementioned circumstances, the objective of the present disclosure is to provide an air conditioner control system and the like capable of performing efficient air conditioning even when the air temperature in the vicinity of the air conditioner is different from the air temperature at the location of installation of the air conditioning control device.

Solution to Problem

In order to achieve the aforementioned objective, an air conditioner control system of the present disclosure includes:

an air conditioner including a temperature measurer configured to measure a first air temperature of an installation location space of the air conditioner, the air conditioner being configured to perform, based on the measured first air temperature and a stored first set temperature, air conditioning of an air conditioning space that is subject to air conditioning;

an air conditioning control device including a temperature measurer configured to measure a second air temperature of the air conditioning space, and a controller configured to switch between an ON state and an OFF state of a signal output based on the measured second air temperature and a user set temperature set by a user;

a temperature measuring device configured to measure a third air temperature of the air conditioning space; and a connecting device configured to communicably connect to the air conditioner, connect through a signal line to the air conditioning control device, and communicably connect to the temperature measuring device. The connecting device is further configured to estimate the user set temperature based on an ON-OFF state of the signal output of the air conditioning control device sensed through the signal line, and the third air temperature acquired from the temperature measuring device, and calculate a second set temperature based on the first air temperature acquired from the air conditioner and a temperature difference between the estimated user set temperature and the third air temperature acquired from the temperature measuring device, and transmit the calculated second set temperature to the air conditioner. The air conditioner is further configured to update the first set temperature to the second set temperature received from the connecting device.

Advantageous Effects of Invention

According to the present disclosure, the connecting device estimates the user set temperature on the basis of an ON-OFF state of the signal output of the air conditioning control device and the third air temperature measured by the temperature measuring device. Further, the connecting device calculates the second set temperature on the basis of the first air temperature measured by the air conditioner and the temperature difference between the third air temperature and the estimated user set temperature, and the connecting device transmits the calculated second set temperature to the air conditioner. Thus the attainment of efficient air conditioning is enabled due to the ability to set the air conditioner to an appropriate set temperature.

DESCRIPTION OF EMBODIMENTS

Embodiments of the present disclosure are described below in reference to figures.

Figure 1:
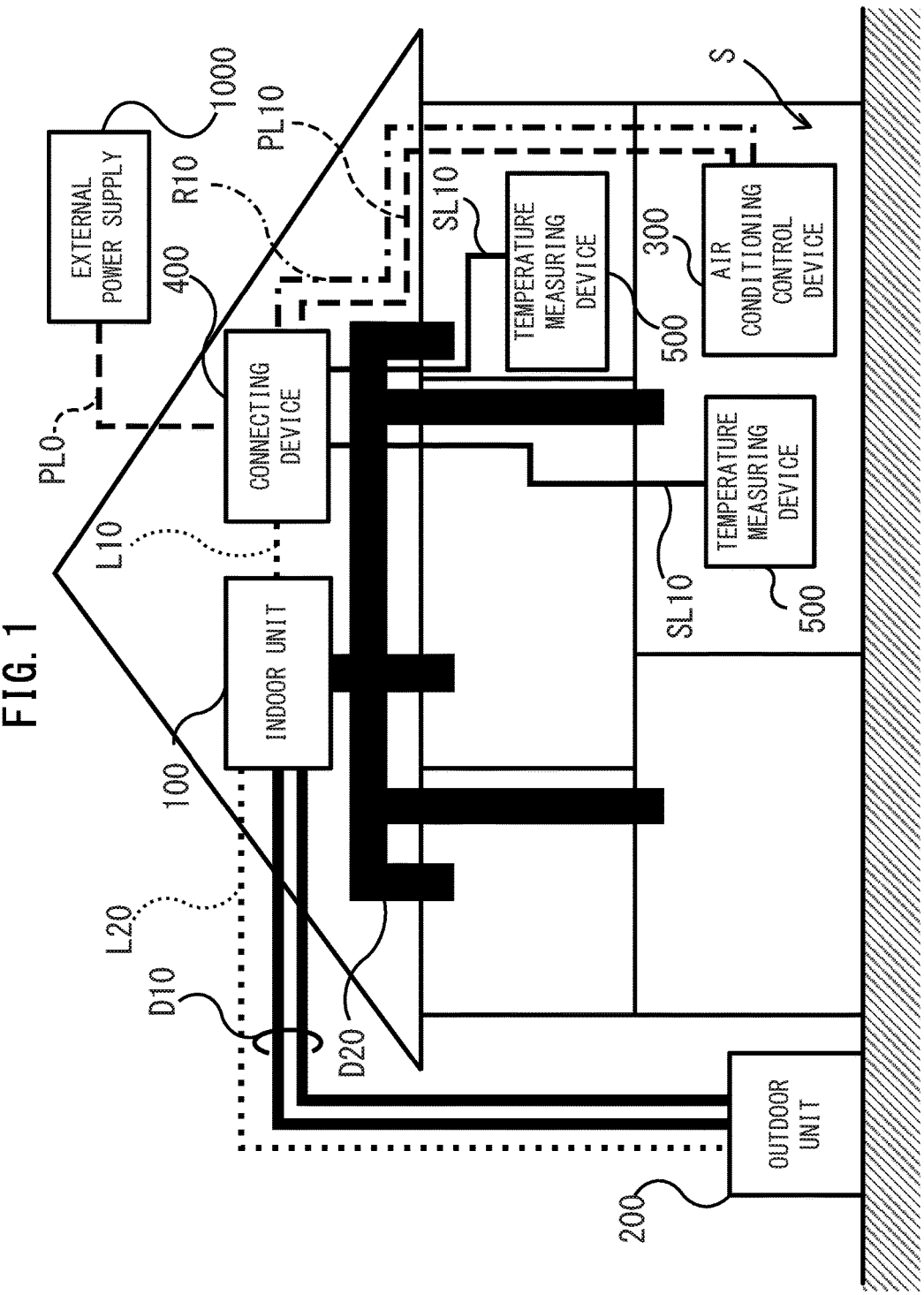
FIG. 1 is a schematic configuration drawing of an air conditioner control system of an embodiment of the present disclosure.

An air conditioning system in the present embodiment is an air conditioning system used, for example, in a building such as a home. As illustrated in FIG. 1, the air conditioning system includes: an air conditioner including an indoor unit 100 and an outdoor unit 200, an air conditioning control device 300 that is a user interface for control of air conditioning, a connecting device 400, and a temperature measuring device 500 arranged in the vicinity of the air conditioning control device 300.

Figure 2:
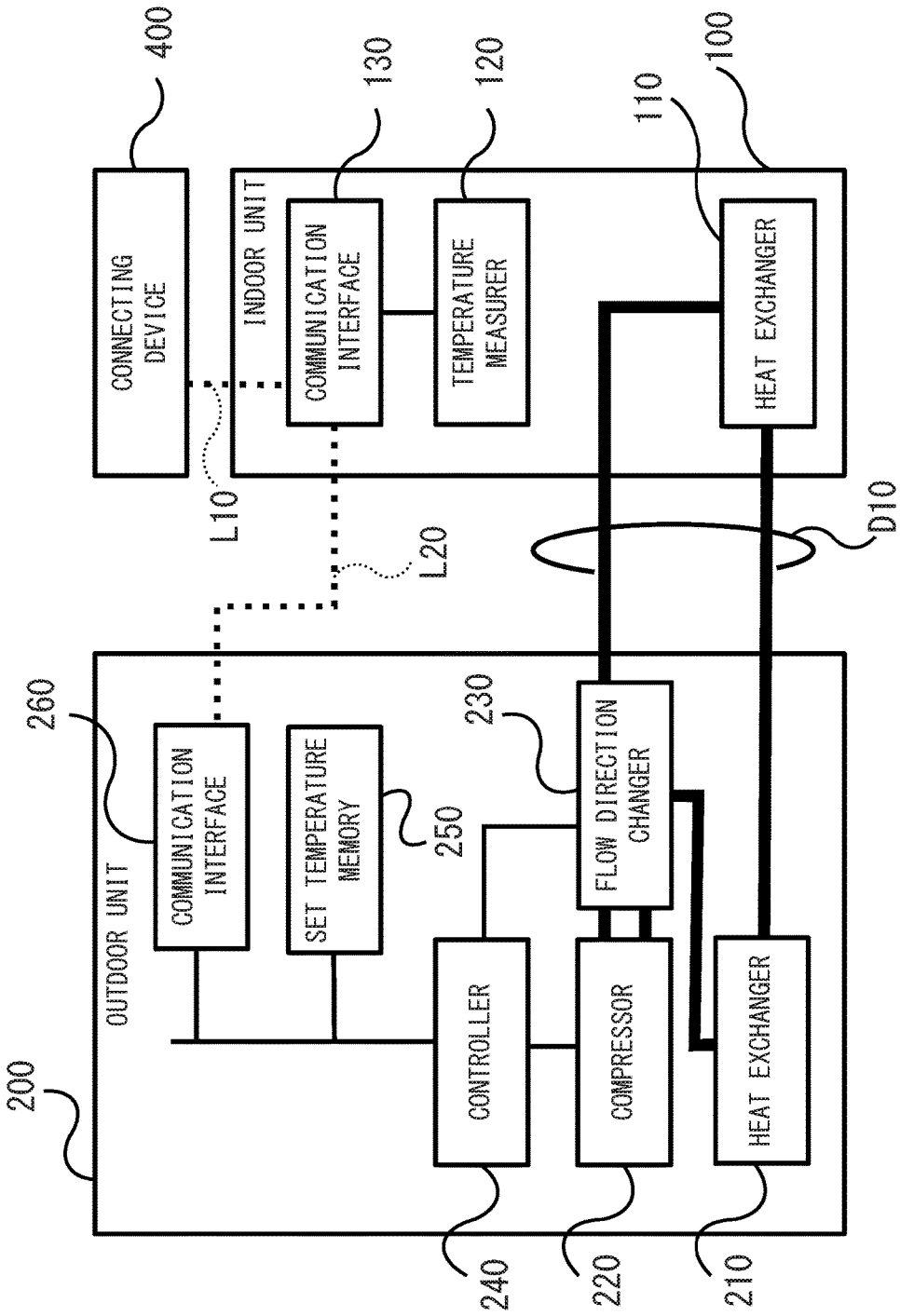
FIG. 2 is a schematic configuration drawing of an indoor unit, outdoor unit and connecting device of the present embodiment.

The indoor unit 100 and the outdoor unit 200 are interconnected by a refrigerant pipe D10 for circulation of a refrigerant, and are interconnected by a communication line L20 such that intercommunication is possible. As illustrated in FIG. 2, the indoor unit 100 includes a heat exchanger 110, a temperature measurer 120, and a communication interface 130. The indoor unit 100, through a duct D20, outputs and sends air, which is either cold or warm air, to each of the rooms, such as a room S, of the building that is subject to air conditioning.

The temperature measurer 120 measures the air temperature of an installation location of the indoor unit 100, and more specifically, measures an intake temperature (first air temperature) TA obtained when air is drawn into a (non-illustrated) housing of the indoor unit 100. The communication interface 130 is connected through a communication line L10 to the connecting device 400 and is connected through a communication line L20 to the outdoor unit 200. Upon receiving data sent from the connecting device 400, the communication interface 130 transmits the data through the communication line L20 to the outdoor unit 200. The temperature measurer 120 transmits the measured intake temperature TA through the communication interface 130 and the communication line L10 to the connecting device 400. Further, the temperature measurer 120 transmits the measured intake temperature TA through the communication interface 130 and the communication line L20 to the outdoor unit 200.

The outdoor unit 200 includes: a heat exchanger 210, a compressor 220 and a flow direction changer 230 that are interposed in the refrigerant pipe D10, a controller 240, a set temperature memory 250 that stores the set temperature (first set temperature) Ts2, and a communication interface 260. The heat exchanger 210, compressor 220, and flow direction changer 230 are connected through the refrigerant pipe D10 to the heat exchanger 110 of the indoor unit 100. The communication interface 260 connects through the communication line L20 to the indoor unit 100.

The flow direction changer 230, for example, includes a combination of multiple types of valves including three-way valves, and causes a change of direction of the cooling medium flowing through the refrigerant pipe D10. The flow direction changer 230, in the cooling mode and the heating mode, reverses the direction of flow of the cooling medium flowing through the refrigerant pipe D10 on the basis of a control signal input from the controller 240.

The controller 240 includes, for example, a central processing unit (CPU). Control of the rotation speed of the compressor 220 enables the controller 240 to perform stepwise control of flow rate of the cooling medium circulating through the refrigerant pipe D10. Further, the controller 240, on the basis of data (various types of commands and set temperatures) sent from the connecting device 400 and received through the indoor unit 100, performs control of starting and stopping of operation of the compressor 220, performs control of the operation mode (cooling mode or heating mode) of the compressor 220, and updates the set temperature Ts2.

The set temperature memory 250 includes rewritable non-volatile memory, for example, such as a flash memory. The controller 240, upon receiving data containing the set temperature sent from the connecting device 400, updates the set temperature Ts2 stored in the set temperature memory 250 to the set temperature contained in the received data.

The controller 240 controls the rotation speed of the compressor 220 on the basis of the present operation mode, the set temperature Ts2, and the intake temperature TA. Specifically, the controller 240 controls the rotation speed of the compressor 220 in response to the difference between the set temperature Ts2 and the intake temperature TA. The controller 240 causes an increase in the rotation speed of the compressor 220 as the temperature difference between the set temperature Ts2 and the intake temperature TA increases. This increase strengthens the indoor heating or cooling. On the other hand, the controller 240 causes a decrease in the rotation speed of the compressor 220 as the temperature difference between the set temperature Ts2 and the intake temperature TA decreases. This decrease lowers the strength of the indoor heating or cooling. Further, when the set temperature Ts2 and the intake temperature TA are substantially equal, the controller 240 maintains the rotation speed of the compressor 220 at a minimum rotation speed. Intake temperature TA is maintained roughly constant by such operation.

Figure 3:
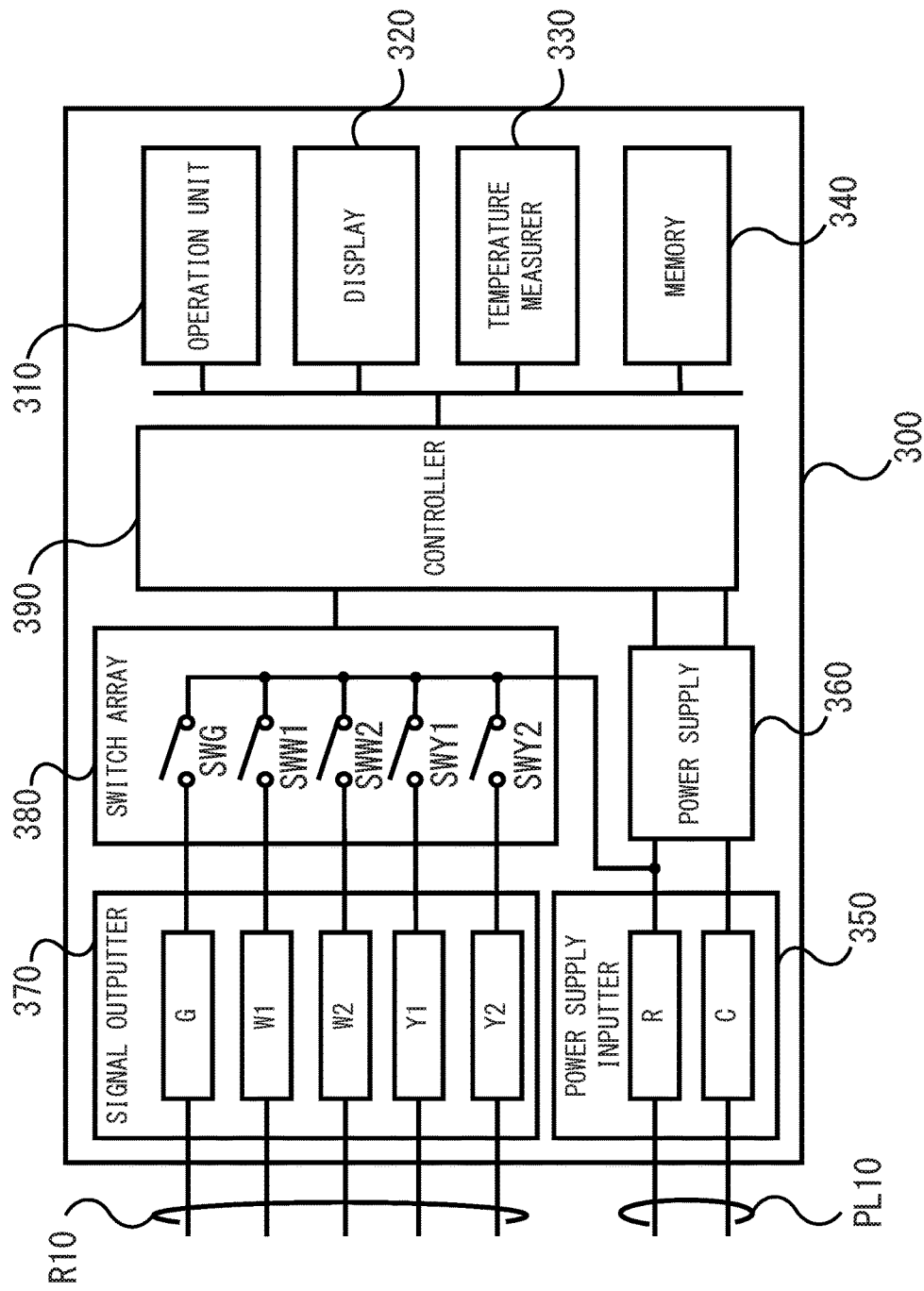
FIG. 3 is a schematic configuration drawing of the air conditioning control device of the present embodiment.

The air conditioning control device 300, for example, includes the thermostat and is arranged at a location such as a wall surface of a room such as the room S. As illustrated in FIG. 3, the air conditioning control device 300 includes: an operation unit 310 operated by the user when switching operation mode of the air conditioner, a display 320, a temperature measurer 330, a memory 340, a power supply inputter 350, a power supply 360, a signal outputter 370, and a switch array 380.

The operation unit 310 includes, for example, a (non-illustrated) push button. By the user appropriately pressing the push button and operating the operation unit 310, operations can be performed such as switching of the air conditioner between operation modes and updating of the set temperature Ts of the room, that is, the user set temperature.

The display 320 includes, for example, a liquid crystal display (LCD). The display 320 displays, on the basis of information input from the controller 390, information such as the operation mode of the air conditioner, the set temperature Ts of the room, and the indoor temperature T1, that is, the second air temperature, measured by the temperature measurer 330.

The temperature measurer 330 includes, for example, a component such as a thermocouple or thermistor. The temperature measurer 330 measures the indoor temperature T1 in the vicinity of the air conditioning control device 300 and outputs the measured temperature to the controller 390. In the case of installation of the air conditioning control device 300 on the wall surface of a room, the temperature measurer 330 measures the indoor temperature T1 of the room in which the air conditioning control device 300 is installed.

The memory 340 includes rewriteable non-volatile memory, for example, such as a flash memory. The memory 340 stores: set temperature information indicating the set temperature Ts of the room where the air conditioning control device 300 is installed, allowance range information indicating an allowance range $\Delta T1$ of fluctuation of the indoor temperature T1 relative to the set temperature Ts of the room, and operation mode information indicating the operation mode of the air conditioner.

As illustrated in FIG. 1 and FIG. 3, the power supply inputter 350 includes an R terminal (voltage terminal) and a C terminal (common terminal), and includes a terminal block for connection to the power supply line PL10 leading from the connecting device 400. AC power at a voltage such as 24 volts is supplied from the connecting device 400 to the power supply inputter 350 through the power supply line PL0.

The power supply 360, for example, includes an AC-DC converter that has: a (non-illustrated) smoothing circuit that converts AC power input from the power supply inputter 350 into DC power, and a (non-illustrated) voltage conversion circuit such as a step-down chopper circuit and the like that converts voltage of the DC power input from the smoothing circuit. The power supply 360 converts the 24 volt AC power input from the power supply inputter 350, for example, into 5 volt DC power, and outputs the DC power to the controller 390.

The signal outputter 370 includes a terminal block connected to the signal line R10. The terminal block used in this signal outputter 370, for example, can be a terminal block that conforms to the wire connection method generally used for thermostats in North America. In this case, as illustrated in FIG. 3, the signal outputter 370 includes: a G terminal for connection to a ventilation fan, a W1 terminal and a W2 terminal for connection to a heating device, and a Y1 terminal and a Y2 terminal for connection to a cooling device.

The switch array 380, for example, includes multiple switches SWG, SWW1, SWW2, SWY1, and SWY2. The multiple switches SWG, SWW1, SWW2, SWY1, and SWY2, for example, include relays such as mechanical relays or semiconductor relays. Each of the multiple switches SWG, SWW1, SWW2, SWY1, and SWY2 of the switch array 380 is turned ON and OFF on the basis of a control signal input from the controller 390. Here, for example, only the switch SWW1 of the switch array 380 is taken to be in the ON state, and the other switches SWG, SWW2, SWY1, and SWY2 are taken to be in the OFF state. In this case, 24 volts of AC power is applied only to the W1 terminal of the signal outputter 370.

The controller 390 includes, for example, a CPU. The controller 390, in response to an input from the operation unit 310, performs operations such as controlling content displayed on the display 320 and updating the set temperature Ts stored in the memory 340. Further, the controller 390 switches the ON-OFF state of the signal output of the signal outputter 370 in response to the relationship between the set temperature Ts and the indoor temperature (second air temperature) T1 of the surroundings of the air conditioning control device 300 acquired from the temperature measurer 330. Specifically, the controller 390 switches the ON-OFF state of the signal output of each of the terminals of the signal outputter 370 by controlling the ON-OFF state of each of the multiple switches SWG, SWW1, SWW2, SWY1, and SWY2 of the switch array 380.

Figure 4:
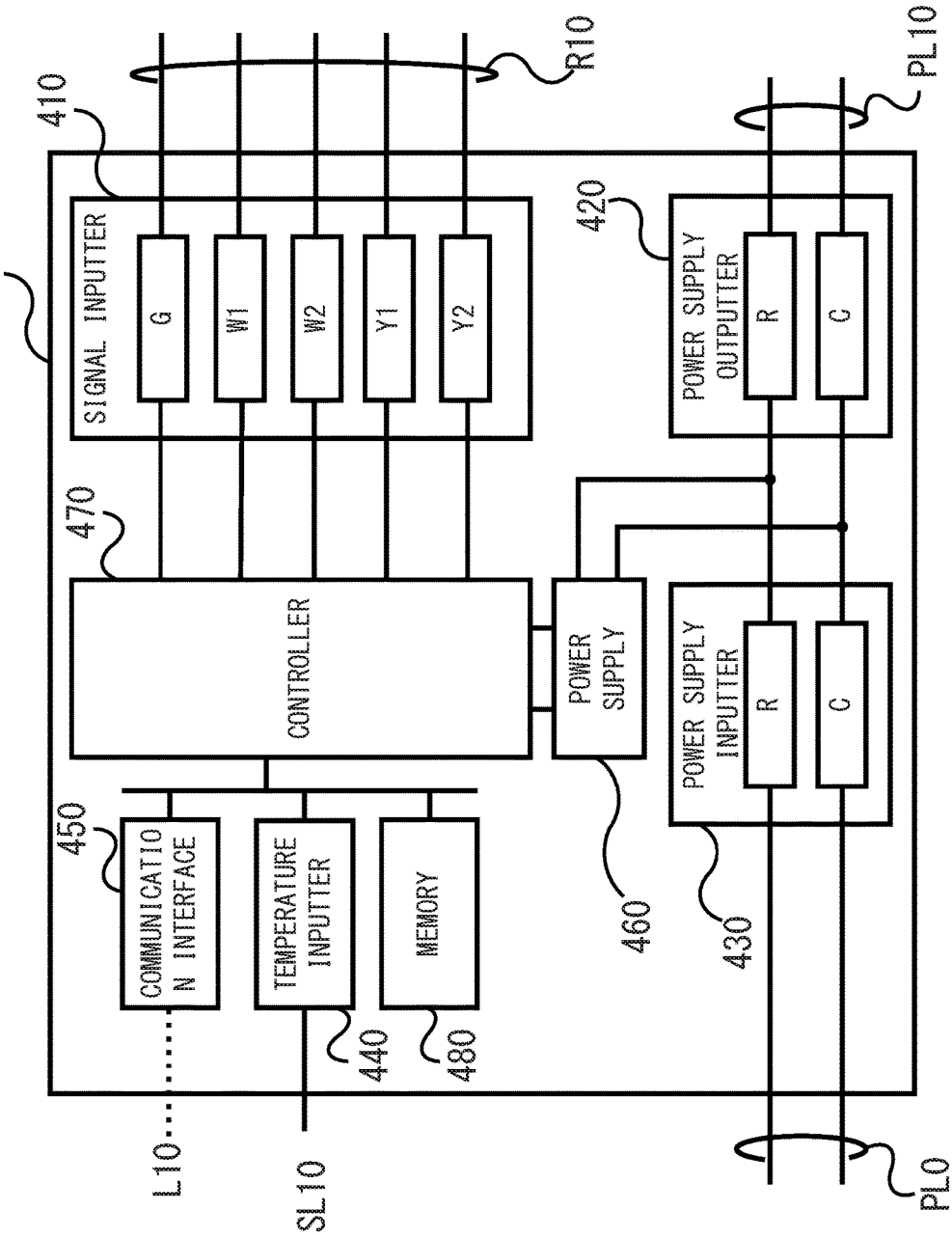
FIG. 4 is a schematic configuration drawing of the connecting device of the present embodiment.

As illustrated in FIG. 1 and FIG. 4, the connecting device 400 includes: a signal inputter 410 connected through the signal line R10 to the air conditioning control device 300, a power supply outputter 420, a power supply inputter 430 connected through the power supply line PL0 to an external power supply 1000, a temperature inputter 440, a communication interface 450, a power supply 460, a controller 470, and a memory 480.

The signal inputter 410 includes, for example, a terminal block. As illustrated in FIG. 4, the signal inputter 410 includes a G terminal, W1 terminal, W2 terminal, Y1 terminal, and Y2 terminal corresponding to the respective terminals of the signal outputter 370 of the air conditioning control device 300.

The power supply outputter 420 includes, for example, a terminal block that includes an R terminal (voltage terminal) and a C terminal (common terminal). The power supply outputter 420 is connected through the power supply line PL10 to the power supply inputter 350 of the air conditioning control device 300. The power supply outputter 420 outputs as is the AC power input from the power supply inputter 430 through the power supply line PL10 to the power supply inputter 350.

The power supply inputter 430 includes, for example, a terminal block that includes an R terminal (voltage terminal) and a C terminal (common terminal) and is used for connection of the power supply line PL0 leading from the external power supply 1000. The power supply inputter 430 receives the supply of AC power through the power supply line PL0 from the external power supply 1000.

The temperature inputter 440 includes, for example, a terminal block or connectors. The temperature inputter 440 is connected through a signal line SL10 to the temperature measuring device 500.

The communication interface 450 includes, for example, connectors. As illustrated in FIG. 2 and FIG. 4, the communication interface 450 is connected through the communication line L10 to the communication interface 130 of the indoor unit 100. Due to this configuration, the controller 470 of the connecting device 400 can perform operations such as: receiving from the indoor unit 100 through the communication line L10 the intake temperature TA measured by the indoor unit 100, and transmitting various types of commands or the set temperature Ts2 to the outdoor unit 200 through the communication line L10, communication interface 130, and communication line L20.

The power supply 460 includes an AC-DC converter that converts, for example, the 24 volt AC power input from the power supply inputter 430 to 5 volt DC power.

The controller 470 includes, for example, a CPU. The controller 470, on the basis of the input voltage to each terminal of the signal inputter 410, determines, for each of the switches SWG, SWW1, SWW2, SWY1, and SWY2 included in the switch array 380 of the air conditioning control device 300, whether the switch is ON or OFF. Then the controller 470 generates various types of commands on the basis of the ON-OFF state of each of the switches SWG, SWW1, SWW2, SWY1, and SWY2, and transmits the generated commands to the outdoor unit 200 through the communication line L10, communication interface 130, and communication line L20.

Further, the controller 470 calculates the set temperature Ts2, that is, the second set temperature. Then the controller 470 transmits the calculated set temperature Ts2 to the outdoor unit 200 through the communication line L10, the communication interface 130 of the indoor unit 100, and the communication line L20.

Furthermore, the controller 470 includes a (non-illustrated) timer for performing timing of a set temperature update time, which is the timing of updating of the set temperature of the air conditioner, and for performing timing of a stability determination time for determination that the indoor temperature is stabilized. The timer includes, for example, a counter synchronized with an internal clock of the controller 470.

The memory 480 includes rewriteable non-volatile memory, for example, such as a flash memory. The memory 480 stores various types of commands that are transmitted to the air conditioner, that is, the indoor unit 100. Specifically, the memory 480 stores a cooling mode operation start command, a cooling mode operation stop command, a heating mode operation start command, and a heating mode operation stop command. Further, the memory 480 stores an indoor temperature lower limit Tth(L), an indoor temperature upper limit Tth(H), an estimate set temperature Tss (estimated user set temperature), and an estimate allowance range $\Delta$Tth. This data is stored in the memory 480 by the controller 470.

The temperature measuring device 500 measures the indoor temperature T2, that is, the third air temperature, in the vicinity of the air conditioning control device 300. The temperature measuring device 500 includes a thermocouple or thermistor. The temperature measuring device 500 is connected to the temperature inputter 440 of the connecting device 400.

Operation of the air conditioning system of the present embodiment is described below. This description particularly concerns the switch control processing executed by the controller 390 of the air conditioning control device 300 and the air conditioner control processing executed by the controller 470 of the connecting device 400.

Figure 5:
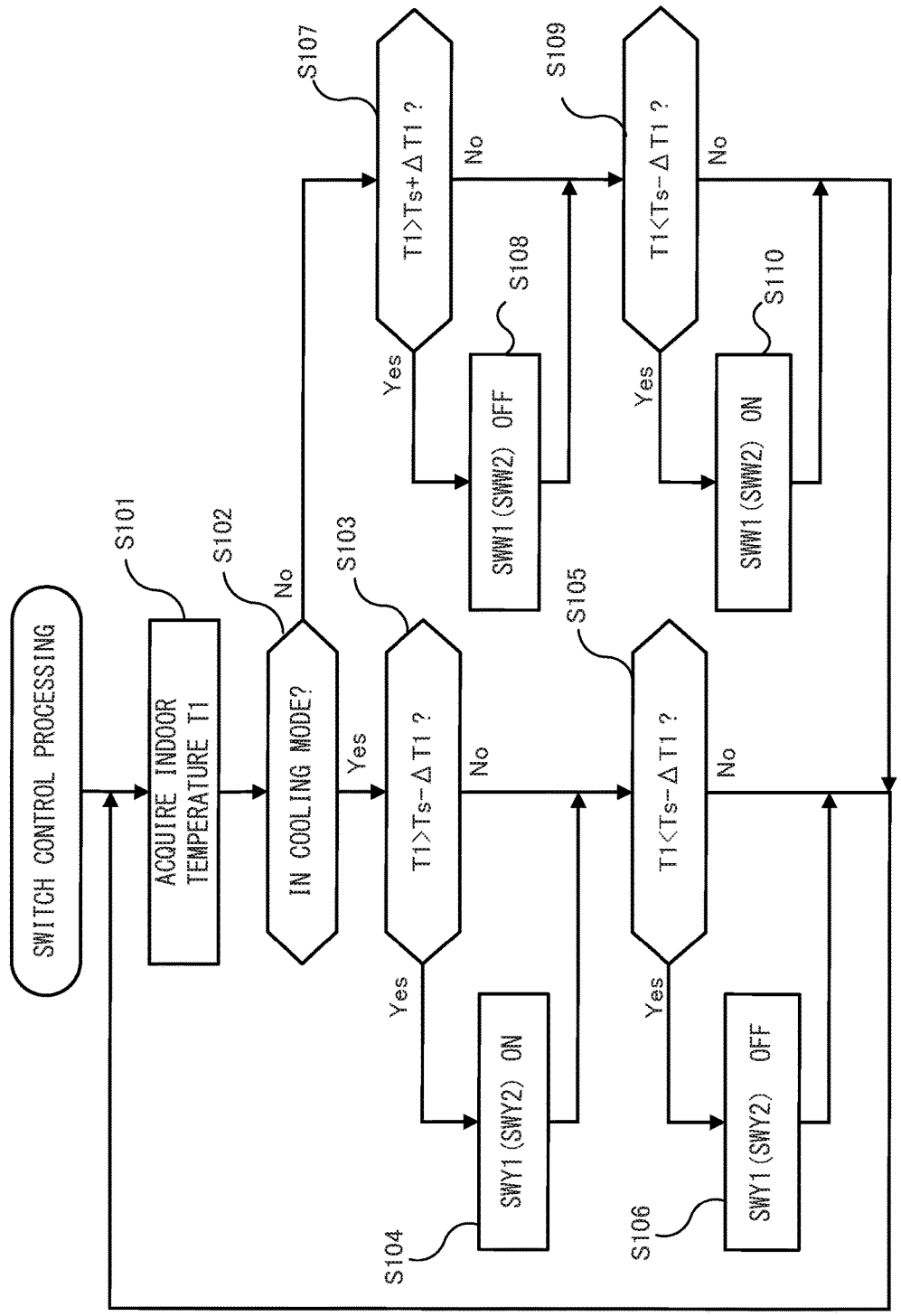
FIG. 5 is a flowchart illustrating an example of switch control processing of the present embodiment.

Firstly, the switch control processing executed by the controller 390 of the air conditioning control device 300 is described in reference to FIG. 5. The switch control processing illustrated in FIG. 5 is started, for example, by the user operating the air conditioning control device 300 and turning ON the power supply of the air conditioning system.

Firstly, the controller 390 acquires the indoor temperature (second air temperature) T1 from the temperature measurer 330 (step S101).

Thereafter, the controller 390 determines, on the basis of the operation mode information stored in the memory 340, whether the operation mode of the air conditioner is set to the cooling mode (step S102).

Upon determination in step S102 that the operation mode is set to the cooling mode (YES in step S102), the controller 390 determines whether the indoor temperature T1 is higher than the allowance range ΔT1 plus the set temperature (user set temperature) Ts used in the cooling mode (step S103). Here, the controller 390 acquires from the memory 340 the allowance range ΔT1 and the set temperature Ts used in cooling mode. The set temperature Ts, for example, is set to 26° C., and the allowance range ΔT1, for example, is set to 2° C.

Determination in step S103 that the indoor temperature T1 is higher than the allowance range ΔT1 plus the set temperature Ts used in the cooling mode (YES in step S103), for example, corresponds to the case in which the set temperature Ts is 26° C., the allowance range ΔT1 is 2° C., and the indoor temperature T1 is higher than 28° C. In this case, the controller 390 turns ON the switch SWY1 and/or the switch SWY2 of the switch array 380 (step S104), and then performs the processing of step S105. Here, when the switch SWY1 (switch SWY2) of the switch array 380 is already turned ON, the controller 390 performs directly, without other processing, the processing of step S105.

On the other hand, upon determination in step S103 that the indoor temperature T1 is lower than or equal to the allowance range ΔT1 plus the set temperature Ts (NO in step S103), the controller 390 performs directly, without other processing, the processing of step S105.

In step S105, the controller 390 determines whether the indoor temperature T1 is lower than the set temperature Ts used in the cooling mode minus the allowance range ΔT1.

Determination in step S105 that the indoor temperature T1 is lower than the set temperature Ts used in the cooling mode minus the allowance range ΔT1 (YES in step S105), for example, corresponds to the case in which the set temperature Ts is 26° C., the allowance range ΔT1 is 2° C., and the indoor temperature T1 is lower than 24° C. In this case, the controller 390 turns OFF the switch SWY1 (switch SWY2) of the switch array 380 (step S106), and then performs the processing of step S101. Here, when the switch SWY1 (switch SWY2) of the switch array 380 is already turned OFF, the controller 390 performs directly, without performing other processing, the processing of step S101.

On the other hand, upon determination in step S105 that the indoor temperature T1 is higher than the set temperature Ts minus the allowance range ΔT1 (NO in step S105), the controller 390 performs directly, without other processing, the processing of step S101.

Further, upon determination in step S102 that the operation mode is set to the heating mode (NO in step S102), the controller 390 determines whether the indoor temperature T1 is higher than the allowance range ΔT1 plus the set temperature Ts used in the heating mode (step S107). Here, the controller 390 acquires from the memory 340 the allowance range ΔT1 and the set temperature Ts used in heating mode.

Upon determination in step S107 that the indoor temperature T1 is higher than the allowance range ΔT1 plus the set temperature Ts used in the heating mode (YES in step S107), the controller 390 turns OFF the switch SWW1 (switch SWW2) of the switch array 380 (step S108), and then performs the processing of step S109. Here, when the switch SWW1 (switch SWW2) of the switch array 380 is already turned OFF, the controller 390 performs directly, without performing other processing, the processing of step S109.

On the other hand, upon determination in step S107 that the indoor temperature T1 is less than or equal to the set temperature Ts plus the allowance range ΔT1 (NO in step S107), the controller 390 performs directly, without other processing, the processing of step S109.

In step S109, the controller 390 determines whether the indoor temperature T1 is lower than the allowance range ΔT1 below the set temperature Ts.

Upon determination in step S109 that the indoor temperature T1 is lower than the set temperature Ts minus the allowance range ΔT1 (YES in step S109), the controller 390 switches the switch SWW1 (switch SWW2) of the switch array 380 ON (step S110), and then performs the processing of step S101. Here, when the switch SWW1 (switch SWW2) of the switch array 380 is already turned ON, the controller 390 performs directly, without performing other processing, the processing of step S101.

The air conditioning control device 300 configured in the above described manner has a temperature range (twice the allowance range ΔT1) between a temperature at which the switch SWY1 (switch SWY2) or the switch SWW1 (switch SWW2) is switched from ON to OFF and a temperature of switching from OFF to ON, whether operating in the cooling mode or in the heating mode. This enables prevention of the switch SWY1 (switch SWY2) or switch SWW1 (switch SWW2) frequently switching repeatedly ON-OFF during a short time period.

Figure 6:
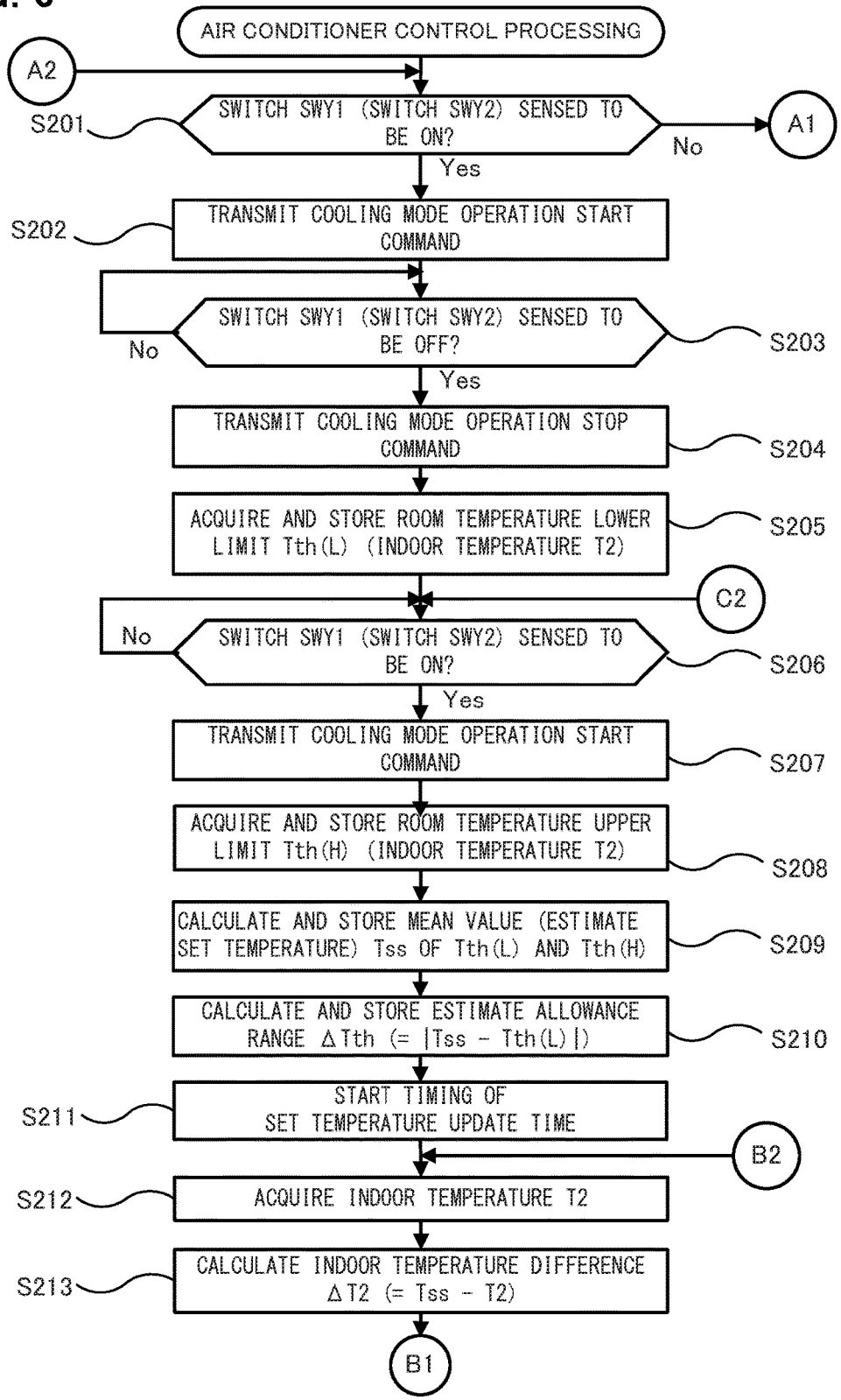
FIG. 6 is a flowchart illustrating an example of air conditioning control processing when the air conditioner of the present embodiment is operated in a cooling mode.
Figure 8:
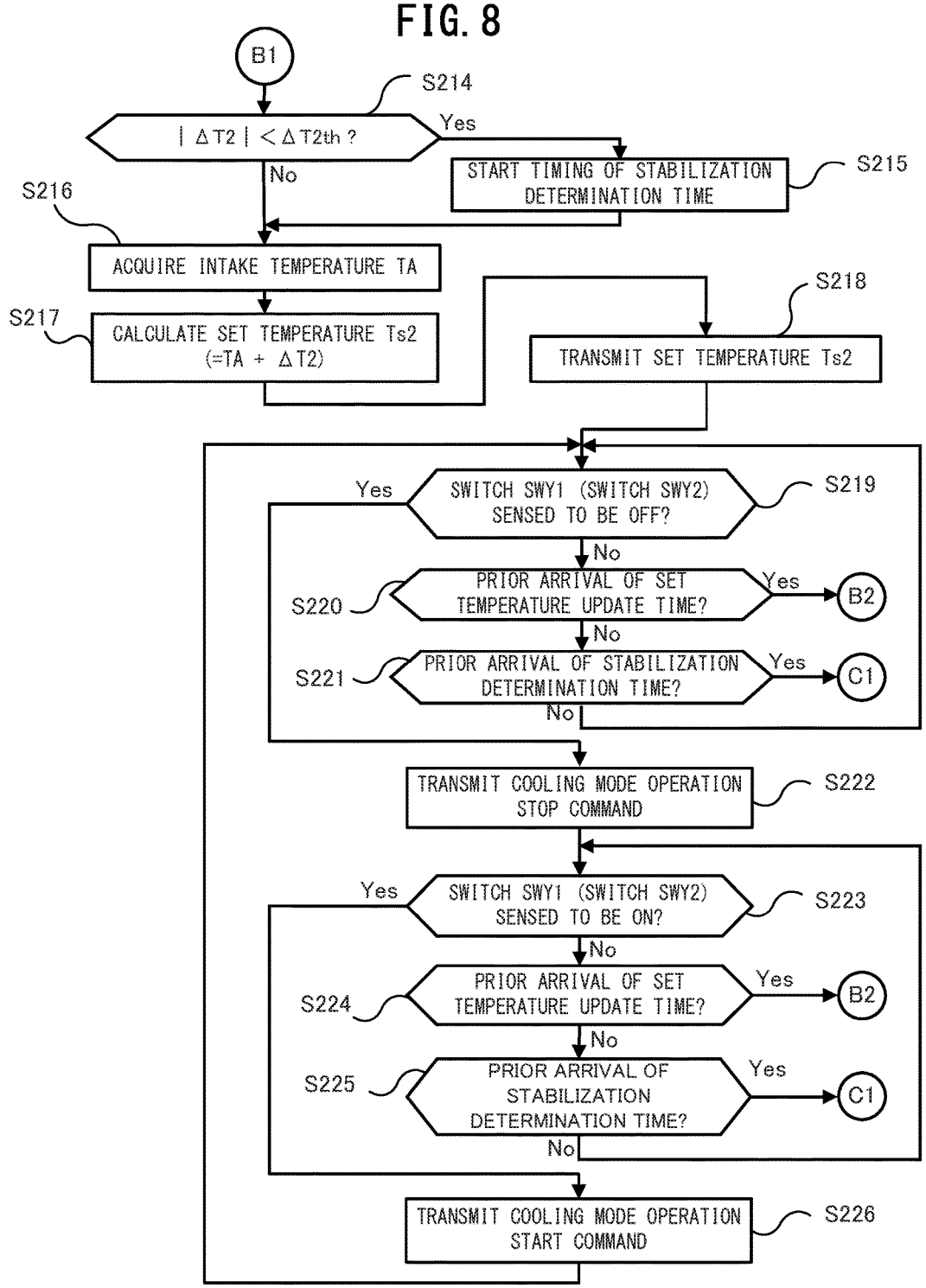
FIG. 8 is a flowchart illustrating the example of the air conditioning control processing when the air conditioner of the present embodiment is operated in the cooling mode.
Figure 9:
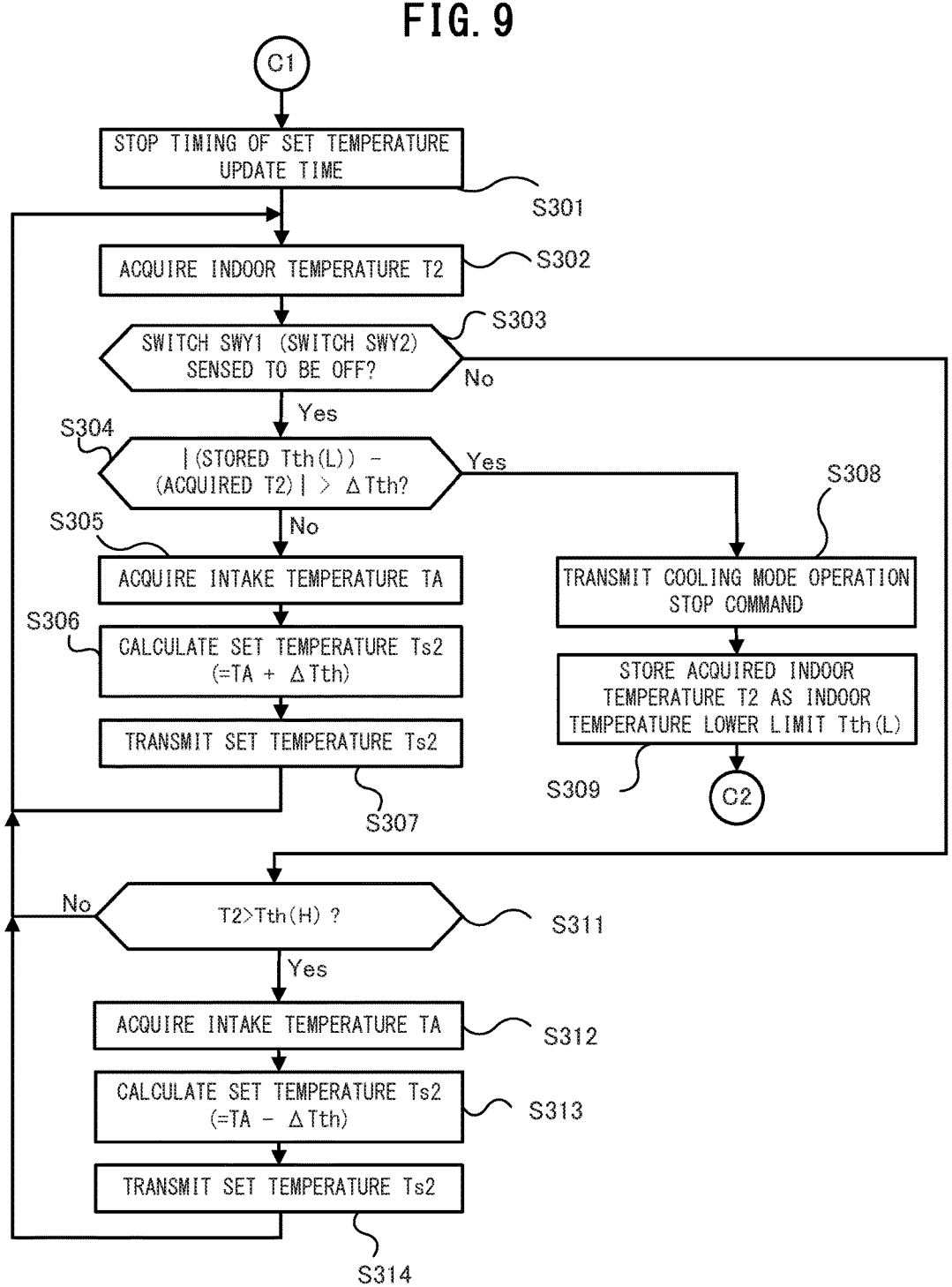
FIG. 9 is a flowchart illustrating the example of the air conditioning control processing when the air conditioner of the present embodiment is operated in the cooling mode.

The air conditioner control processing executed by the controller 470 of the connecting device 400 is described below in reference to FIG. 6 through FIG. 13. Furthermore, in FIGS. 10, 12, and 13, processing that is the same as the processing illustrated in FIGS. 6, 8, and 9 is assigned the same reference sign. The air conditioner control processing is started, for example, by the user operating the air conditioning control device 300 and turning ON the power supply of the air conditioning system.

As illustrated in FIG. 6, the controller 470 determines whether the switch SWY1 (switch SWY2) is sensed to be ON (step S201). That is to say, the controller 470 determines whether there is prior performance of processing to operate in the cooling mode by the air conditioning control device 300.

Figure 10:
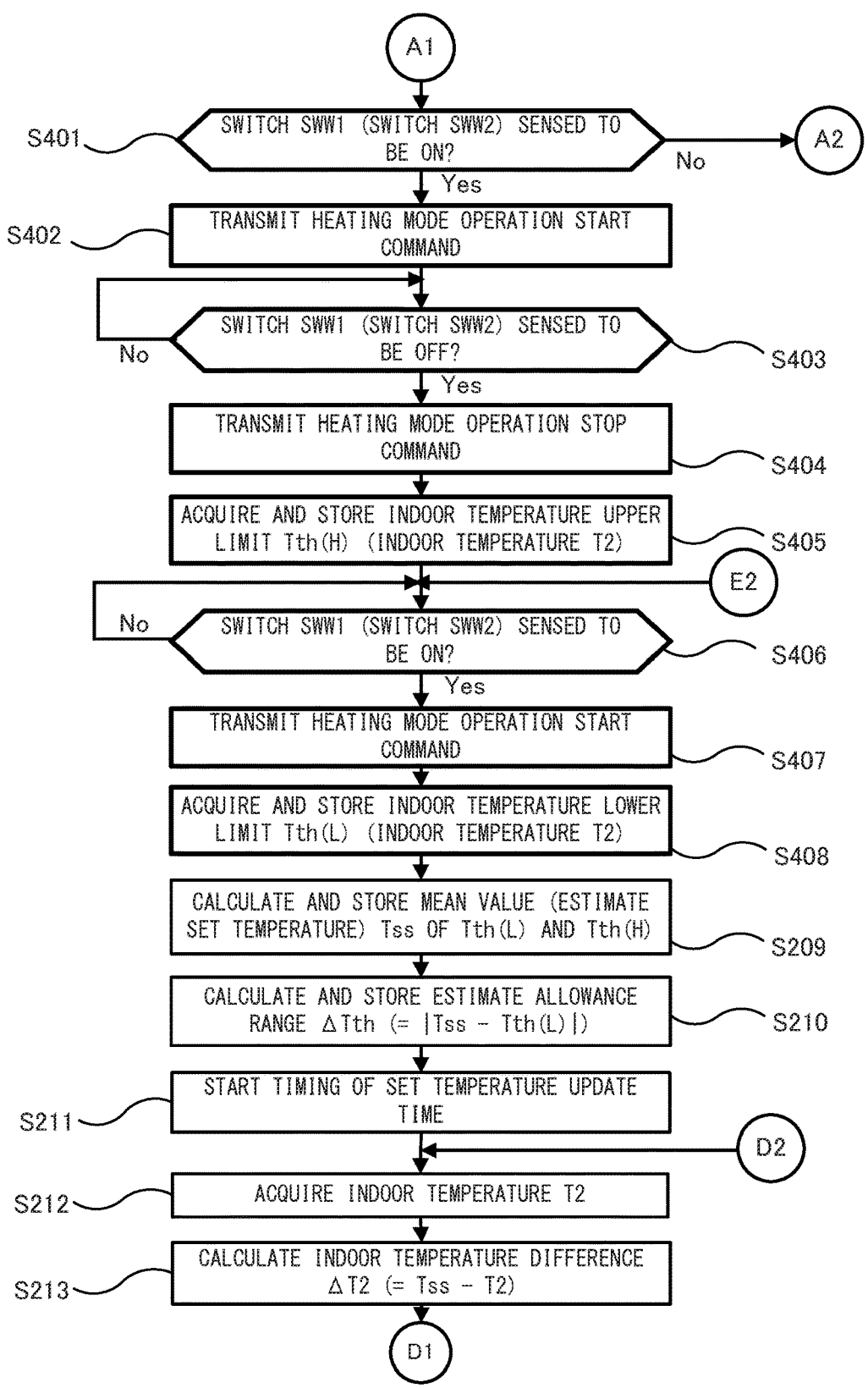
FIG. 10 is a flowchart illustrating an example of air conditioning control processing when the air conditioner of the present embodiment is operated in a heating mode.

When ON status of the switch SWY1 (switch SWY2) is not sensed in step S201 (NO in step S201), as illustrated in FIG. 10, the controller 470 determines whether the switch SWW1 (switch SWW2) is sensed to be ON (step S401). That is to say, the controller 470 determines whether there is prior processing by the air conditioning control device 300 to operate in the heating mode.

Here, the controller 470 monitors voltages of the Y1 terminal (Y2 terminal) and the W1 terminal (W2 terminal) of the signal inputter 410. The controller 470 determines that the switch SWY1 (switch SWY2) is ON upon sensing the application of AC voltage to the Y1 terminal (Y2 terminal), and determines that the switch SWW1 (switch SWW2) is ON upon sensing the application of AC voltage to the W1 terminal (W2 terminal).

Upon determination in step S401 that the ON status of the switch SWW1 (switch SWW2) is not sensed (NO in step S401), the controller 470 again performs the processing of step S201. In the above manner, the controller 470 repeats the processing of step S201 and step S401 until the switch SWY1 (switch SWY2) or the switch SWW1 (switch SWW2) is sensed to be ON.

Firstly, the case in which the switch SWY1 (switch SWY2) is sensed by the controller 470 to be ON (YES in step S201), that is to say, the case of operation in the cooling mode, is described. In this case, the controller 470 transmits the cooling mode operation start command to the outdoor unit 200 (step S202). Specifically, the controller 470 transmits the cooling mode operation start command acquired from the memory 480 to the outdoor unit 200 through the communication line L10, communication interface 130, and communication line L20.

Figure 7:
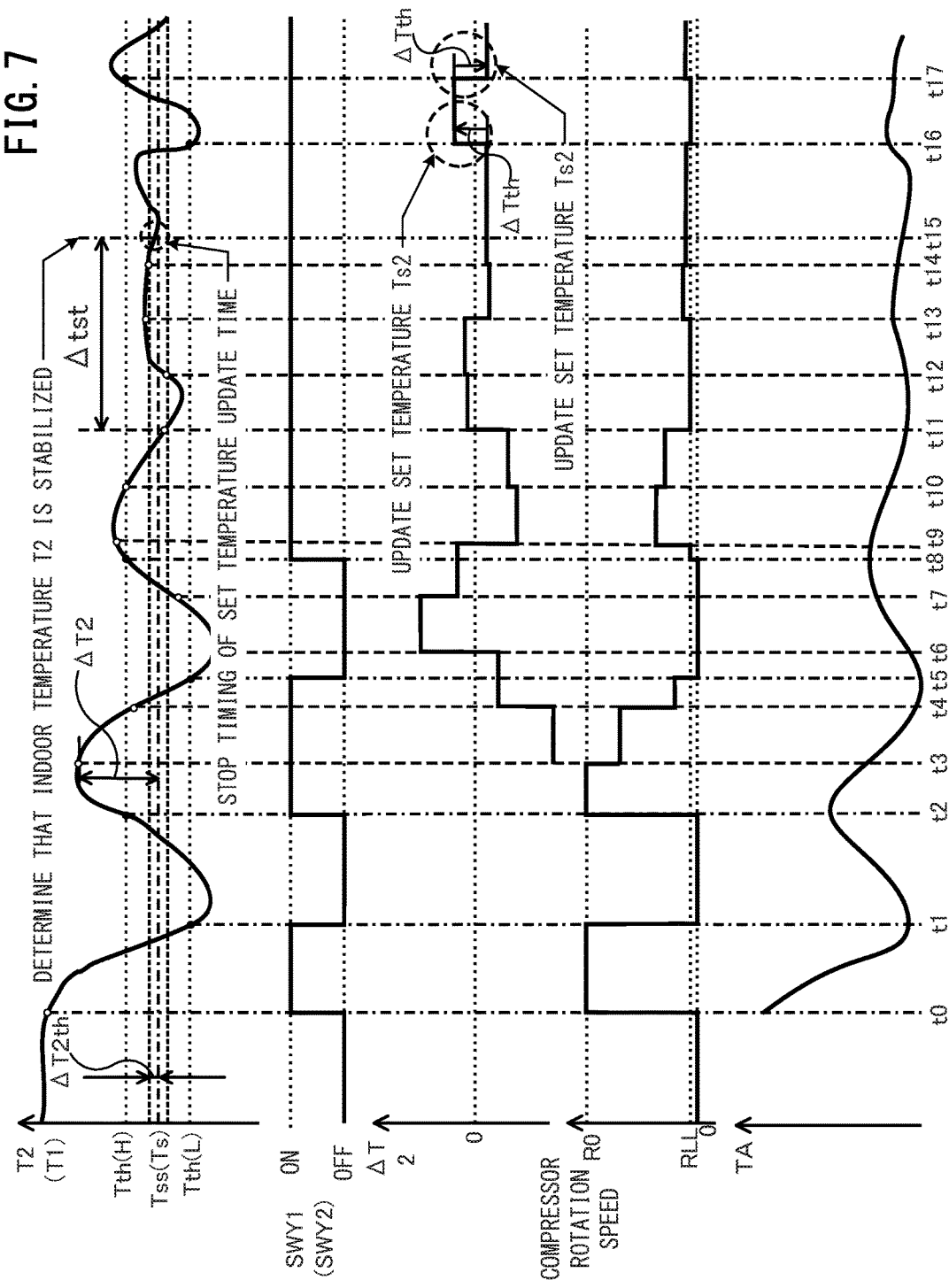
FIG. 7 is a timing chart illustrating relationships between an indoor temperature, switching, an indoor temperature difference, a compressor rotation speed and an intake temperature when the air conditioner of the present embodiment is operating in the cooling mode.

As illustrated in FIG. 7, when the switch SWY1 (switch SWY2) is turned ON at the time t0, the cooling mode operation start command is input to the outdoor unit 200 from the controller 470, and the controller 240 causes the compressor 220 to operate at an initial rotation speed R0. Thereafter, the intake temperature (first air temperature) TA and the indoor temperature (third air temperature) T2 of the room, such as room S, in which the temperature measuring device 500 is installed decline with the passage of time. Here, the indoor temperature T2 does not track the fluctuation of the intake temperature TA. This lack of tracking is due to the existence of effects such as thermal heat capacity of the duct D20 that is the air flow path from the indoor unit 100 to the room, such as room S, subject to air conditioning in which the temperature measuring device 500 is installed.

Again in reference to FIG. 6, after step S202, the controller 470 determines whether the switch SWY1 (switch SWY2) is sensed to be OFF (step S203). Specifically, upon sensing that the voltage of the Y1 terminal (Y2 terminal) of the signal inputter 410 is approximately zero, the controller 470 determines that the switch SWY1 (switch SWY2) is sensed to be OFF. The controller 470 maintains a wait state as long as the switch SWY1 (switch SWY2) is not sensed to be OFF (NO in step S203).

Upon determination in step S203 that the OFF status of the switch SWY1 (switch SWY2) is sensed (YES in step S203), the controller 470 transmits the cooling mode operation stop command to the air conditioner (step S204). Specifically, the controller 470 transmits the cooling mode operation stop command acquired from the memory 480 to the outdoor unit 200 through the communication line L10, the communication interface 130 of the indoor unit 100, and the communication line L20.

As illustrated in FIG. 7, when the indoor temperature T1 (T2) at time t1 is lower than the set temperature Ts minus the allowance range $\Delta T1$ (lower than the indoor temperature lower limit Tth (L)), the controller 390 of the air conditioning control device 300 turns the switch SWY1 (switch SWY2) OFF. Thereafter, the cooling mode operation stop command from the controller 470 is input to the outdoor unit 200, and the controller 240 stops the compressor 220. Then soon after the stoppage of the compressor 220, the indoor temperature T2 and the intake temperature TA rise with the passage of time.

Again in reference to FIG. 6, after step S204, the controller 470 acquires the indoor temperature lower limit Tth(L) and causes storage thereof in the memory 480 (step S205). Specifically, the controller 470 stores the indoor temperature (third air temperature) T2 in the memory 480, as the indoor temperature lower limit Tth(L), the indoor temperature (third air temperature) T2 acquired using the temperature measuring device 500 at the time of change from ON to OFF of the switch SWY1 (switch SWY2).

Thereafter, the controller 470 determines whether the ON status of the switch SWY1 (switch SWY2) is sensed (step S206). Specifically, the controller 470 determines that the switch SWY1 (switch SWY2) is sensed to be ON upon sensing the application of AC voltage to the Y1 terminal (Y2 terminal) of the signal inputter 410. The controller 470 maintains a wait state as long as the switch SWY1 (switch SWY2) is not sensed to be ON (NO in step S206).

Upon sensing that the switch SWY1 (switch SWY2) is ON in step S206 (YES in step S206), the controller 470 transmits the cooling mode operation start command to the air conditioner (step S207).

As illustrated in FIG. 7, when the indoor temperature T1 (T2) at time t2 is higher than the set temperature Ts plus the allowance range $\Delta T1$ (higher than the indoor temperature upper limit Tth (H)), the controller 390 of the air conditioning control device 300 turns the switch SWY1 (switch SWY2) ON. Thereafter, the cooling mode operation start command from the controller 470 is input to the outdoor unit 200, and the controller 240 causes a restarting of operation of the compressor 220. Then soon after the starting of operation of the compressor 220, the indoor temperature T2 and the intake temperature TA decline with the passage of time.

Again in reference to FIG. 6, after step S207, the controller 470 acquires the indoor temperature upper limit Tth(H) and causes the indoor temperature upper limit Tth(H) to be stored in the memory 480 (step S208). Specifically, the controller 470 causes, as the indoor temperature lower limit Tth(L), the indoor temperature T2 acquired using the temperature measuring device 500 at the time of change from ON to OFF of the switch SWY1 (switch SWY2) to be stored in the memory 480.

Thereafter, the controller 470 calculates a mean value of the indoor temperature upper limit Tth(H) and the indoor temperature lower limit Tth(L), and causes the calculated mean value to be stored in memory 480 as an estimate set temperature Tss (estimated user set temperature) (step S209). The estimate set temperature Tss approximately matches the set temperature Ts (user set temperature) of the air conditioning control device 300.

Thereafter, the controller 470 calculates an absolute value |Tss−Tth(L)| of the difference between the estimate set temperature Tss and the indoor temperature lower limit Tth(L), and causes storage of the absolute value in the memory 480 as an estimate allowance range $\Delta$Tth (step S210). The estimate allowance range $\Delta$Tth approximately matches the allowance range $\Delta T1$.

Thereafter, the controller 470 starts timing (set temperature update time) of the updating of the set temperature of the air conditioner (step S211). Specifically, the controller 470 performs updating of the set temperature Ts2 after the start of timing by the timer until reaching a fixed time interval, such as 10 minutes.

Thereafter, the controller 470 acquires the indoor temperature T2 (step S212). The controller 470 performs the processing of step S212 firstly at the timing start time of the set temperature update time, and thereafter repeats such processing each time the set temperature update time is reached.

Thereafter, the controller 470 calculates an indoor temperature difference $\Delta T2$ obtained by subtracting the acquired indoor temperature T2 from the estimate set temperature Tss (step S213).

Thereafter, as illustrated in FIG. 8, the controller 470 determines whether the absolute value of the indoor temperature difference $\Delta T2$, $|\Delta T2|$, is smaller than an indoor temperature difference zero determination range $\Delta T2th$ (step S214). Here, when the indoor temperature difference $\Delta T2$ absolute value $|\Delta T2|$ is smaller than the indoor temperature difference zero determination range $\Delta T2th$, the controller 470 determines that the indoor temperature difference $\Delta T2$ is substantially zero.

When the indoor temperature difference $\Delta T2$ absolute value $|\Delta T2|$ is determined in step S214 to be smaller than the indoor temperature difference zero determination range $\Delta T2th$ (YES in step S214), the controller 470 starts the timing of the stability determination time (step S215), and then performs the processing of step S216.

As shown in FIG. 7, upon determination at a time t11, which is the set temperature update time, that the indoor temperature difference $\Delta T2$ absolute value $|\Delta T2|$ is smaller than the indoor temperature difference zero determination range $\Delta T2th$, the controller 470 starts the timing of the stability determination time.

Again in reference to FIG. 8, on the other hand, when the indoor temperature difference $\Delta T2$ absolute value $|\Delta T2|$ s determined in step S214 to be greater than or equal to the indoor temperature difference zero determination range $\Delta T2th$ (NO in step S214), the controller 470 performs directly, without performing other processing, the processing of step S216.

In step S216, the controller 470 acquires the intake temperature (first air temperature) TA from the indoor unit 100 through the communication line L10 and the communication interface 450.

Thereafter, the controller 470 calculates the set temperature Ts2 by adding the indoor temperature difference $\Delta T2$ to the acquired intake temperature TA (step S217).

Thereafter, the controller 470 transmits the calculated set temperature (second set temperature) Ts2 to the outdoor unit 200 through the communication line L10, communication interface 130, and communication line L20 (step S218).

As illustrated in FIG. 7, the estimate set temperature Tss is lower than the acquired indoor temperature T2 at a time t3 that is the set temperature update time. In this case, the set temperature Ts2 is set to a temperature that is the intake temperature TA minus the indoor temperature difference $\Delta T2$ absolute value $|\Delta T2|$. Thereafter the controller 240 sets the rotation speed of the compressor 220 on the basis of the size of the absolute value $|\Delta T2|$. The controller 240 sets, on the basis of the absolute value $|\Delta T2|$, the rotation speed of the compressor 220 to a rotation speed that is smaller than the initial rotation speed R0. Thereafter, at each time of arrival of the set temperature update time (for example, at t4, t6, t7, t9, t10, t11, t12, t13, and t14), the set temperature Ts2 is transmitted from the controller 470 to the outdoor unit 200. Further, upon each reception of the set temperature Ts2, the controller 240 updates the set temperature Ts2 stored in the set temperature memory 250 and appropriately updates the rotation speed of the compressor 220 on the basis of the updated set temperature Ts2. Further, at the times t6, t7, t11, and t12, the indoor temperature T2 (T1) is lower than the estimate set temperature Tss, and the set temperature Ts2 is set to a temperature higher than the intake temperature TA. In this case, the controller 240 sets the rotation speed of the compressor 220 to a minimum rotation speed RLL.

Again in reference to FIG. 8, after step S218, the controller 470 determines whether the switch SWY1 (switch SWY2) is sensed to be OFF (step S219).

Upon the switch SWY1 (switch SWY2) not being sensed to be OFF in step S219 (NO in step S219), the controller 470 determines, on the basis of output of the timer, whether there is prior arrival of the set temperature update time (step S220).

Upon determination in step S220 that there is prior arrival of the set temperature update time (YES in step S220), the controller 470 performs the processing of step S212.

As illustrated in FIG. 7, at a time, such as the time t4, the indoor temperature difference $\Delta T2$ absolute value $|\Delta T2|$ is less than the absolute value $|\Delta T2|$ of the indoor temperature difference at the time t3. In this case, the controller 240 updates the rotation speed of the compressor 220 to a rotation speed that is smaller than the rotation speed set at the time t3.

Again in reference to FIG. 8, the determination in step S220, on the other hand, is taken to be that there is no prior arrival of the set temperature update time (NO in step S220). In this case, the controller 470 determines, on the basis of the output of the timer, whether there is a prior arrival of the stability determination time (step S221). The stability determination time corresponds to the time period after start of the timing of the stability determination time and then passage of a determination standard time $\Delta tst$ (see FIG. 7). The determination standard time $\Delta tst$, for example, is set to 6 hours.

When the determination in step S221 is that there is a prior arrival of the stability determination time (YES in step S221), the controller 470 performs the processing of the step S301 illustrated in FIG. 9.

On the other hand, as illustrated in FIG. 8, when the determination is step S221 that there is no prior arrival of the stability determination time (NO in step S221), the controller 470 again performs the processing of step S219.

Moreover, upon sensing in step S219 that the switch SWY1 (switch SWY2) is OFF (YES in step S219), the controller 470 transmits the cooling mode operation stop command to the air conditioner (step S222).

As illustrated in FIG. 7, when the indoor temperature T1 (T2) at the time t5 is below a temperature (indoor temperature lower limit Tth(L)) that is the set temperature Ts minus the allowance range $\Delta T1$, the controller 390 of the air conditioning control device 300 turns OFF the switch SWY1 (switch SWY2). Thereafter, the cooling mode operation stop command from the controller 470 is input to the outdoor unit 200, and the controller 240 causes the compressor 220 to stop. Then soon after the compressor 220 stops, the indoor temperature T2 and the intake temperature TA rise with the passage of time.

Again in reference to FIG. 8, after step S222, the controller 470 determines whether there is sensing that the switch SWY1 (switch SWY2) is ON (step S223).

When the determination in step S223 is that the switch SWY1 (switch SWY2) is not sensed to be ON (NO in step S223), the controller 470 determines, on the basis of the output of the timer, whether there is prior arrival of the set temperature update time (step S224).

When the determination in step S224 is that there is prior arrival of the set temperature update time (YES in step S224), the controller 470 performs the processing of step S212.

On the other hand, when the determination in step S224 is that there is prior arrival of the set temperature update time (NO in step S224), the controller 470 determines, on the basis of the output of the timer, whether there is prior arrival of the stability determination time (step S225).

When the determination in step S225 is that of arrival of the stability determination time (YES in step S225), the controller 470 performs the processing of the step S301 illustrated in FIG. 9.

On the other hand, when the determination is step S225 that there is prior arrival of the stability determination time (NO in step S225), the controller 470 again performs the processing of step S223.

Further, when there is sensing in step S223 that the switch SWY1 (switch SWY2) is ON (YES in step S223), the controller 470 transmits the cooling mode operation start command to the air conditioner (step S226), and then repeats the processing of step S219.

As illustrated in FIG. 7, at a time, such as time t8, when the indoor temperature T1 (T2) exceeds a temperature (indoor temperature upper limit Tth(H)) that is the set temperature Ts plus the allowance range ΔT1, the controller 390 of the air conditioning control device 300 turns ON the switch SWY1 (switch SWY2). Thereafter, the cooling mode operation start command from the controller 470 is input to the outdoor unit 200, and the controller 240 that controls the compressor 220 again causes operation of the compressor 220. At this time, the controller 240 causes the compressor 220 to rotate at the rotation speed set at the time t7, which is the immediately previous setting update time.

As illustrated in FIG. 9, the controller 470 in step S301 stops the timing of the set temperature update time.

As illustrated in FIG. 7, when the determination at the time t15 is that there is prior arrival of the stability determination time, the controller 470 stops the timing of the set temperature update time, and thereafter does not perform periodic updating of the set temperature Ts2.

Again in reference to FIG. 9, after step S301, the controller 470 acquires the indoor temperature T2 (step S302).

Thereafter, the controller 470 determines whether there is sensing that the switch SWY1 (switch SWY2) is OFF (step S303).

In step S303, the switch SWY1 (switch SWY2) is taken to be sensed to be OFF (YES in step S303). In this case, the controller 470 calculates the absolute value of the difference between the acquired indoor temperature T2 and the indoor temperature lower limit Tth(L) stored in the memory 480, and determines whether this absolute value of the difference is larger than the estimate allowance range ΔTth (step S304).

When the determination in step S304 is that the calculated absolute value of the difference is greater than the estimate allowance range ΔTth (YES in step S304), the controller 470 transmits the cooling mode operation stop command to the air conditioner (step S308).

Thereafter, the controller 470 causes the acquired indoor temperature T2 to be stored in the memory 480 as the indoor temperature lower limit Tth(L) (step S309), and then performs the processing of step S206. That is to say, when the absolute value of the difference is larger than the estimate allowance range ΔTth, the controller 470 determines that there is prior updating of the set temperature Ts at the air conditioning control device 300, and performs processing to update the estimate set temperature Ts.

On the other hand, when the determination in step S304 is that the calculated absolute value of the difference is less than or equal to the estimate allowance range ΔTth (NO in step S304), the controller 470 acquires the intake temperature TA (step S305).

Thereafter, the controller 470 calculates the set temperature Ts2 as a value calculated by adding the estimate allowance range ΔTth to the acquired intake temperature TA (step S306).

Thereafter, the controller 470 transmits the calculated set temperature Ts2 to the outdoor unit 200 through the communication line L10, communication interface 130, and communication line L20 (step S307), and again performs the processing of step S302.

As illustrated in FIG. 7, at the time t16 the indoor temperature T1 (T2), for example, due to a reason such as change of the indoor temperature environment, is taken to be lower than the temperature (indoor temperature lower limit Tth(L)) that is the set temperature Ts minus the allowance range ΔT1. In this case, the controller 390 of the air conditioning control device 300 turns OFF the switch SWY1 (switch SWY2). Thereafter, the controller 470 updates the set temperature Ts2 to a value calculated by adding the estimate allowance range ΔTth to the acquired intake temperature TA. By this means, the set temperature Ts2 at the outdoor unit 200 at the time t16 is set to a temperature higher than the intake temperature TA. Thereafter, the controller 240 updates the rotation speed of the compressor 220 to the minimum rotation speed RLL. Thereafter, for example, at a time t17, when the indoor temperature T1 (T2) exceeds a temperature (indoor temperature upper limit Tth(H)) that is the set temperature Ts plus the allowance range ΔT1, the controller 390 of the air conditioning control device 300 again turns the switch SWY1 (switch SWY2) ON.

Again in reference to FIG. 9, the switch SWY1 (switch SWY2) is taken to not to be sensed to be OFF in step S303 (NO in step S303). In this case, the controller 470 determines whether the indoor temperature T2 is higher than the indoor temperature upper limit Tth(H) (step S311).

When the determination in step S311 is that the indoor temperature T2 is lower than or equal to the indoor temperature upper limit Tth(H) (NO in step S311), the controller 470 again performs the processing of step S302.

On the other hand, when the determination in step S311 is that the indoor temperature T2 is higher than the indoor temperature upper limit Tth(H) (YES in step S311), the controller 470 acquires the intake temperature TA (step S312).

Thereafter, the controller 470 calculates the set temperature Ts2 as a value obtained by subtracting the estimate allowance range ΔTth from the acquired intake temperature TA (step S313).

Thereafter, the controller 470 transmits the calculated set temperature Ts2 to the outdoor unit 200 (step S314), and then again performs the processing of step S302.

As illustrated in FIG. 7, at the time t17 the indoor temperature T1 (T2), for example, due to a reason such as change of the indoor temperature environment, is taken to be higher than the temperature (indoor temperature upper limit Tth(H)) that is the set temperature Ts plus the allowance range ΔT1. In this case, the controller 470 updates the set temperature Ts2 to a value obtained by subtracting the estimate allowance range ΔTth from the acquired intake temperature TA. Thereafter, the controller 240 of the outdoor unit 200 updates the rotation speed of the compressor 220 to a rotation speed corresponding to the updated set temperature Ts2.

The case of the controller 470 sensing that the switch SWW1 (switch SWW2) is ON (YES in step S401), that is, the case of operation of the air conditioning in the heating mode, is described next. In this case, as illustrated in FIG. 10, the controller 470 transmits the heating mode operation start command to the indoor unit 100 (step S402).

Figure 11:
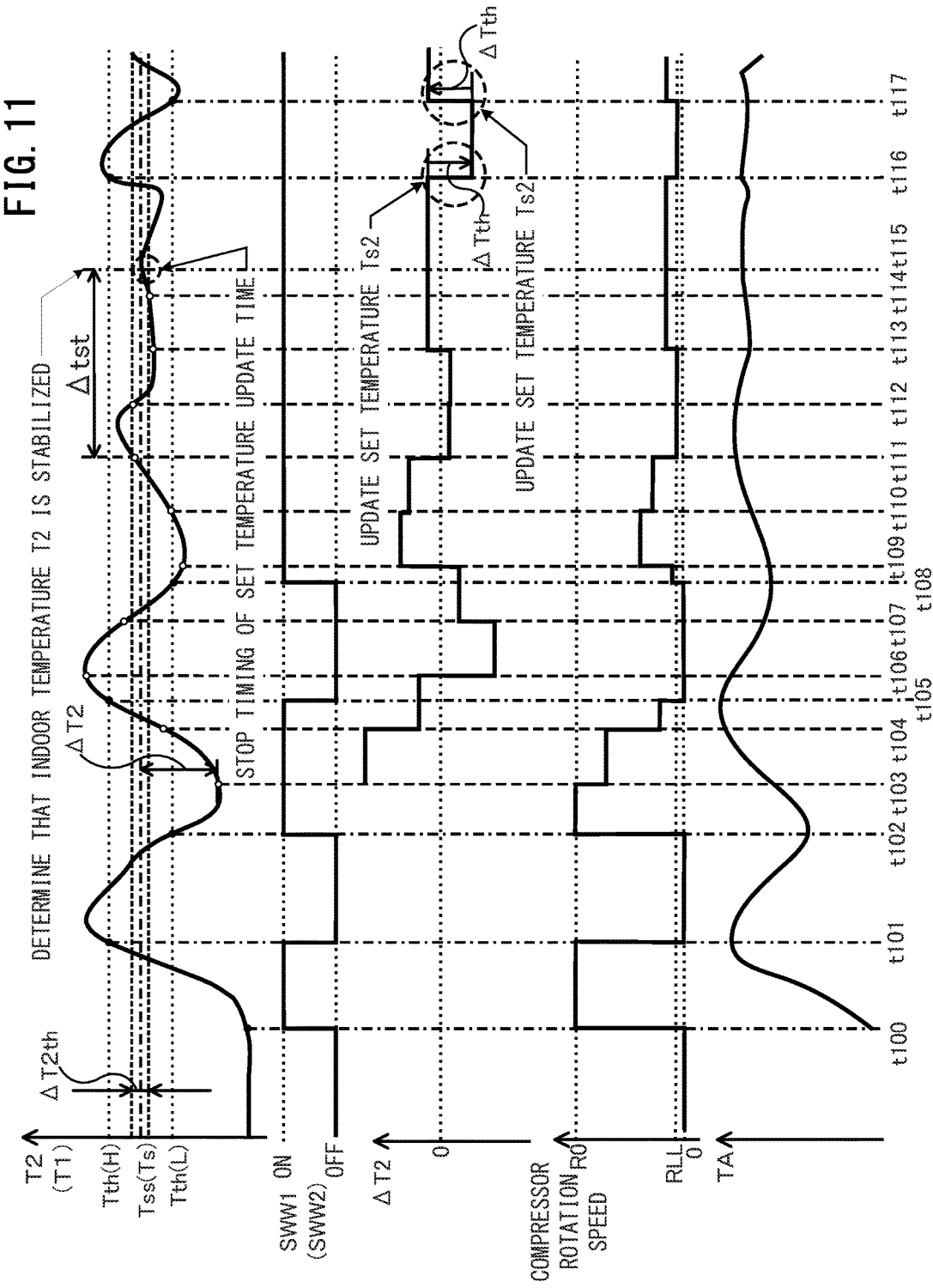
FIG. 11 is a timing chart illustrating relationships between the indoor temperature, switching, indoor temperature difference, compressor rotation speed and intake temperature when the air conditioner of the present embodiment is operating in the heating mode.

As illustrated in FIG. 11, when the switch SWW1 (switch SWW2) is turned ON at a time t100, the heating mode operation start command is input from the controller 470 to the outdoor unit 200. Thereafter, the controller 240 controls the flow direction changer 230 so that the refrigerant flows in the refrigerant pipe D10 in a direction opposite to that in the cooling mode, and then causes operation of the compressor 220 at the initial rotation speed R0. Thereafter, the indoor temperature (third air temperature) T2 and the intake temperature (first air temperature) TA rise with the passage of time.

Again in reference to FIG. 10, after step S402, the controller 470 determines whether there is sensing that the switch SWW1 (switch SWW2) is OFF (step S403). As long as the switch SWW1 (switch SWW2) is not sensed to be OFF (NO in step S403), the controller 470 maintains a wait state.

When the switch SWW1 (switch SWW2) in step S403 is sensed to be OFF (YES in step S403), the controller 470 transmits the heating mode operation stop command to the outdoor unit 200 (step S404).

As illustrated in FIG. 11, when the indoor temperature T1 (T2) at a time t101 exceeds a temperature (indoor temperature lower limit Tth(L)) that is the set temperature Ts minus the allowance range $\Delta T1$, the controller 390 of the air conditioning control device 300 turns OFF the switch SWW1 (switch SWW2). Thereafter, the heating mode operation stop command is input to the outdoor unit 200 from the controller 470, and the controller 240 causes the compressor 220 to stop. Then soon after the stoppage of the compressor 220, the indoor temperature T2 and the intake temperature TA decrease with the passage of time.

Thereafter, the controller 470 acquires, and then stores in memory 480, the indoor temperature upper limit Tth(H) (step S405). This indoor temperature upper limit Tth(H) corresponds to the indoor temperature (third air temperature) T2 obtained when the switch SWW1 (switch SWW2) changes from ON to OFF.

Thereafter, the controller 470 determines whether the switch SWW1 (switch SWW2) is sensed to be ON (step S406). As long as the switch SWW1 (switch SWW2) is sensed to be ON (NO in step S406), the controller 470 maintains a wait state.

When the switch SWY1 (switch SWY2) in step S406 is sensed to be ON (YES in step S406), the controller 470 transmits the heating mode operation start command to the outdoor unit 200 (step S407).

As illustrated in FIG. 11, when the indoor temperature T1 (T2) at a time t102 is lower than a temperature (indoor temperature limit Tth(L)) that is the set temperature Ts minus the allowance range $\Delta T1$, the controller 390 of the air conditioning control device 300 turns the switch SWW1 (switch SWW2) ON. Thereafter, the heating mode operation start command from the controller 470 is input to the outdoor unit 200, and the compressor controller 240 again causes the compressor 220 to operate. Then soon after the start of operation of the compressor 220, the indoor temperature T2 and the intake temperature TA rise with the passage of time.

Thereafter, as illustrated in FIG. 9, the controller 470 acquires, and stores in the memory 480, the indoor temperature lower limit Tth(L) (step S408). This indoor temperature lower limit Tth(L) corresponds to the indoor temperature T2 obtained when the switch SWW1 (switch SWW2) changes from OFF to ON.

Figure 12:
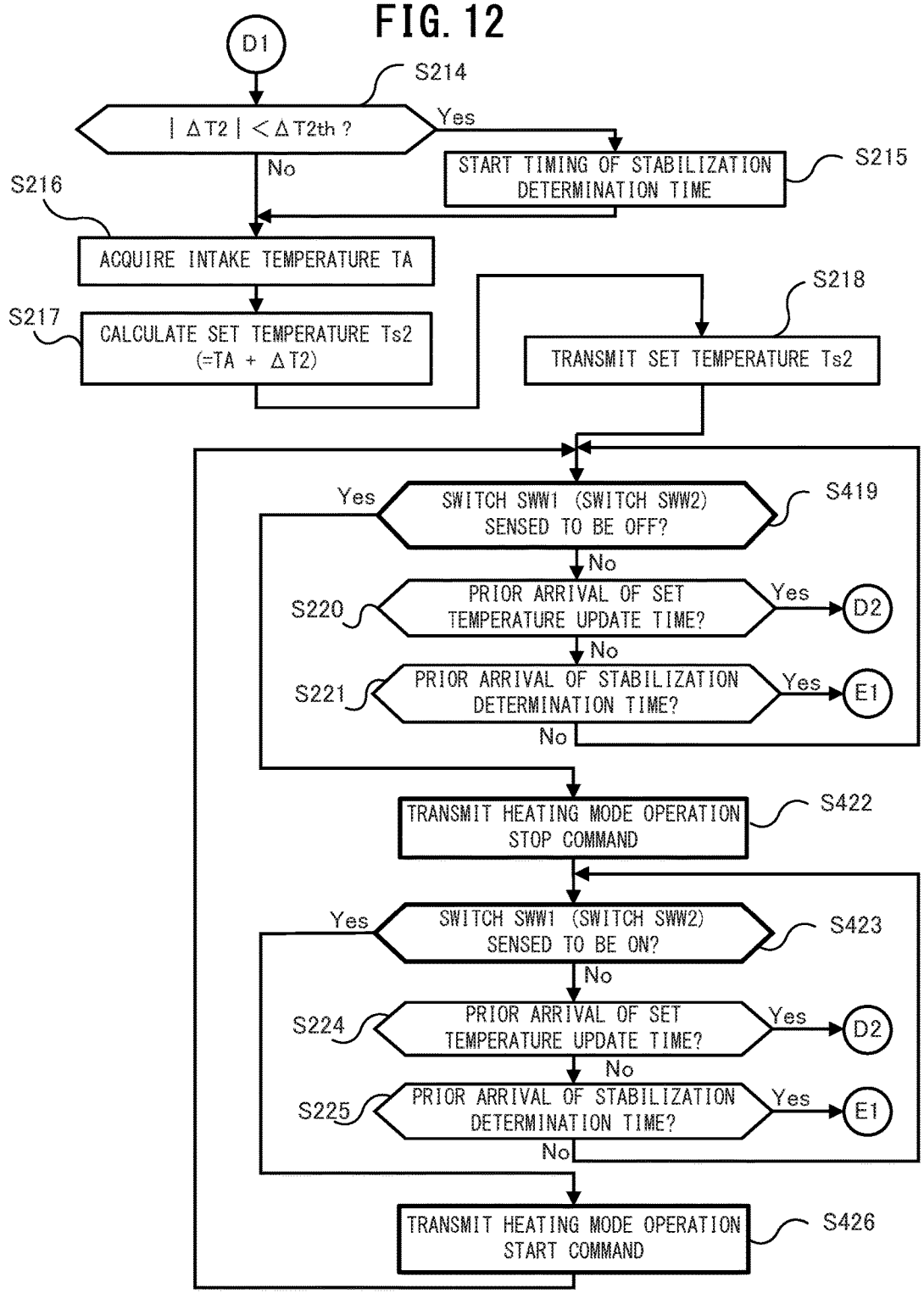
FIG. 12 is a flowchart illustrating the example of the air conditioning control processing when the air conditioner of the present embodiment is operated in the heating mode.

Thereafter, the controller 470 performs the processing from step S210 to step S218 of FIG. 12.

Here, in the same manner as the case of operation of the air conditioner in the cooling mode, the controller 470 transmits the set temperature Ts2 for the air conditioner to the outdoor unit 200 at each arrival of the set temperature update time. The set temperature update time, for example as illustrated in FIG. 11, occurs at t103, t104, t106, t107, t109, t110, t111, t112, t113 and t114. Then with each reception of the set temperature Ts2, the controller 240 updates the set temperature Ts2 stored in the set temperature memory 250, and on the basis of the updated set temperature Ts2, appropriately updates the rotation speed of the compressor 220. Further, the indoor temperature T2 (T1) is higher than the estimate set temperature Tss at the times t106, t107, t111 and t112, and the set temperature Ts2 is set to a temperature lower than the intake temperature TA. In this case, the controller 240 sets the rotation speed of the compressor 220 to the minimum rotation speed RLL.

As illustrated in FIG. 11, at the time t111, which is the set temperature update time, the controller 470 is taken to determine that the indoor temperature difference $\Delta T2$ absolute value $|\Delta T2|$ is less than the indoor temperature difference zero determination range $\Delta T2th$. In this case, in the same manner as the case of operation of the air conditioner in the cooling mode, the controller 470 starts timing of the stability determination time.

Thereafter, as illustrated in FIG. 12, after performance of the processing of step S218, the controller 470 determines whether the switch SWW1 (switch SWW2) is sensed to be OFF (step S419). When the determination in step S419 is that the switch SWW1 (switch SWW2) is not sensed to be OFF (NO in step S419), the controller 470 performs the processing of step S220.

On the other hand, when the switch SWW1 (switch SWW2) in step S419 is sensed to be OFF (YES in step S419), the controller 470 transmits the heating mode operation stop command to the air conditioner (step S422).

As illustrated in FIG. 11, when the indoor temperature T1 (T2) at a time t105 is higher than a temperature (indoor temperature limit Tth(H)) that is the set temperature Ts plus the allowance range $\Delta T1$, the controller 390 of the air conditioning control device 300 turns the switch SWW1 (switch SWW2) OFF. Thereafter, the heating mode operation stop command from the controller 470 is input to the outdoor unit 200, and the compressor controller 240 causes the compressor 220 to stop. Then soon after the stoppage of operation of the compressor 220, the indoor temperature T2 and the intake temperature TA decline with the passage of time.

Thereafter, the controller 470 determines whether the switch SWW1 (switch SWW2) is sensed to be ON (step S423). When the switch SWW1 (switch SWW2) in step S423 is not sensed to be ON (NO in step S423), the controller 470 performs the processing of step S224.

On the other hand, when the switch SWW1 (switch SWW2) is sensed to be ON in step S423 (YES in step S423), the controller 470 transmits the heating mode operation start command to the air conditioner (step S426), and then again performs the processing of step S419.

As illustrated in FIG. 11, when the indoor temperature T1 (T2) at the time t108 is below a temperature (indoor temperature lower limit Tth(L)) that is the set temperature Ts minus the allowance range ΔT1, the controller 390 of the air conditioning control device 300 turns the switch SWW1 (switch SWW2) ON. Thereafter, the heating mode operation start command from the controller 470 is input to the outdoor unit 200, and the controller 240 again causes the compressor 220 to operate. At this time, the controller 240 causes the compressor 220 to rotate at the rotation speed set at the time t107, which is the immediately preceding setting update time.

Figure 13:
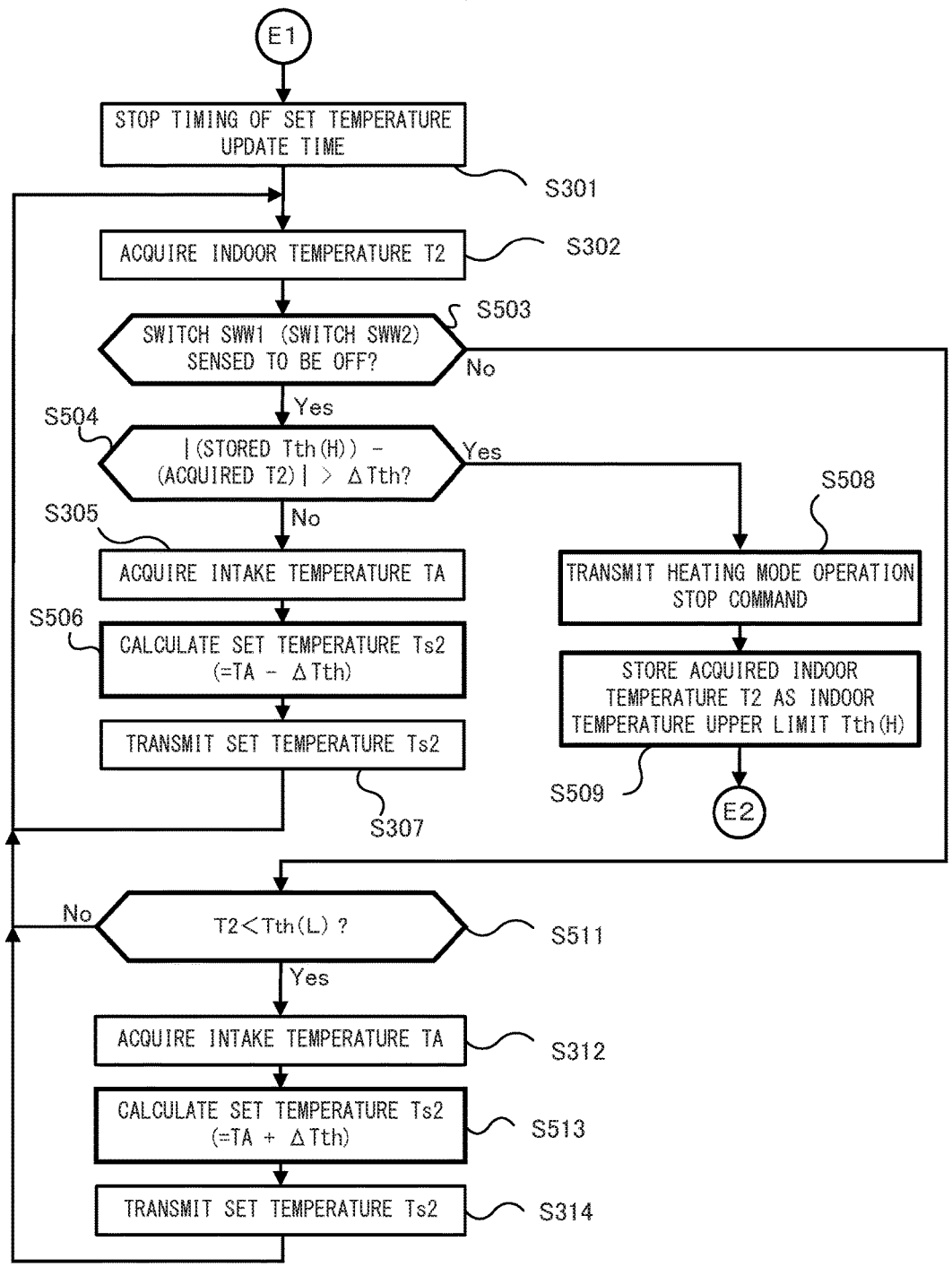
FIG. 13 is a flowchart illustrating the example of the air conditioning control processing when the air conditioner of the present embodiment is operated in the cooling mode.

Further, after the processing of step S301 and step S302 as illustrated in FIG. 13, the controller 470 determines whether the switch SWW1 (switch SWW2) is sensed to be OFF (step S503).

As illustrated in FIG. 11, in the same manner as operation of the air conditioner in the cooling mode, upon determination of the arrival of the stability determination time at the time t115, the controller 470 stops the timing of the set temperature update time, and thereafter does not perform periodic updating of the set temperature Ts2.

The switch SWW1 (switch SWW2) is taken to be sensed to be OFF in step S503 (YES in step S503). In this case, the controller 470 determines whether the absolute value of the difference between the acquired indoor temperature T2 and the indoor temperature upper limit Tth(H) stored in the memory 480 is greater than the estimate allowance range ΔTth (step S504).

When the determination in step S504 is that the absolute value is greater than the estimate allowance range ΔTth (YES in step S504), the controller 470 transmits the heating mode operation stop command to the indoor unit 100 (step S508).

Thereafter, the controller 470 stores the acquired indoor temperature T2 in the memory 480 as the indoor temperature upper limit Tth(H) (step S509), and then performs the processing of step S406.

On the other hand, when the determination in step S504 is that the absolute value of the difference is less than or equal to the estimate allowance range ΔTth (NO in step S504), the controller 470 acquires the intake temperature (first air temperature) TA (step S305). Thereafter, the controller 470 calculates the set temperature Ts2 as a value equal to the acquired intake temperature TA minus the estimate allowance range ΔTth (step S506).

Thereafter, the controller 470 transmits the calculated set temperature Ts2 to the outdoor unit 200 (step S307), and again performs the processing of step S302.

As illustrated in FIG. 11, the indoor temperature T1 (T2) at a time t116 is taken to be higher than a temperature (indoor temperature upper limit Tth(H)) that is the set temperature Ts plus the allowance range ΔT1, for example, due to change of the temperature environment of the room. In this case, the controller 390 of the air conditioning control device 300 turns the switch SWY1 (switch SWY2) OFF. Thereafter, the controller 470 updates the set temperature Ts2 to a value that is the acquired intake temperature TA minus the estimate allowance range ΔTth. At the time t116, the set temperature Ts2 is set to a temperature lower than the intake temperature TA. Thereafter, the controller 240 updates the rotation speed of the compressor 220 to the minimum rotation speed RLL.

Thereafter, when the indoor temperature T1 (T2), for example, at a time t17 is lower than a temperature (indoor temperature lower limit Tth(L)) that is the set temperature Ts minus the allowance range ΔT1, the controller 390 of the air conditioning control device 300 again turns the switch SWY1 (switch SWY2) ON.

Further, the switch SWW1 (switch SWW2) is taken not to be sensed to be ON in the step S503 (NO in step S503). In this case, the controller 470 determines whether the indoor temperature T2 is lower than the indoor temperature lower limit Tth(L) (step S511).

When the determination in step S511 is that the indoor temperature T2 is higher than or equal to the indoor temperature lower limit Tth(L) (NO in step S511), the controller 470 again performs the processing of step S302.

On the other hand, when the determination in step S511 is that the indoor temperature T2 is lower than the indoor temperature lower limit Tth(L) (YES in step S511), the controller 470 acquires the intake temperature TA (step S312).

Thereafter, the controller 470 calculates a value of the set temperature Ts2 by adding the estimate allowance range ΔTth to the acquired intake temperature TA (step S513).

Thereafter, the controller 470 transmits the calculated set temperature Ts2 to the outdoor unit 200 (step S314), and then again performs the processing of step S302.

As illustrated in FIG. 11, the indoor temperature T1 (T2) at a time t17 is taken to be below a temperature (indoor temperature lower limit Tth(L)) that is the set temperature Ts minus the allowance range ΔT1, for example, due to change of the temperature environment of the room. In this case, the controller 470 updates the set temperature Ts2 to the value that is the acquired intake temperature TA plus the estimate allowance range ΔTth. Thereafter, the controller 240 updates the rotation speed of the compressor 220 to a rotation speed corresponding to the set temperature Ts2.

For example, the temperature environment in the vicinity of the indoor unit 100 and the temperature environment of the room S in which the air conditioning control device 300 is installed are taken to be different from one another. In this case, the set temperature (user set temperature) Ts (estimate set temperature Tss) may be different from the intake temperature (first air temperature) TA of the case in which the indoor temperature (third air temperature) T2 are equal to the set temperature Ts. In contrast, the connecting device 400 of the present embodiment calculates the set temperature (second set temperature) T2 on the basis of the intake temperature TA acquired from the indoor unit 100 and a temperature difference between the estimate set temperature Tss and the indoor temperature T2. This configuration enables setting of the air conditioner to the appropriate set temperature T2, thereby enabling efficient air conditioning.

Further, the connecting device 400 enables fine adjustment of control of the intake temperature TA by the indoor temperature different ΔT2 amount between the set temperature Tss and the indoor temperature T2. Thus even if there exists an inherent difference, due to differences in temperature environments, in the intake temperature TA of the vicinity of the indoor unit 100 and the indoor temperature T2 (T1) at the location of the user, the indoor temperature T2 (T1) can be changed by use of the set temperature Tss (Ts), thereby enabling maintenance of comfort in a room, for example, such as the room S.

Further, the connecting device 400 can maintain the temperature difference, which is caused by differences in temperature environment between the room S and the vicinity of the indoor unit 100, between the indoor temperature T2 and the intake temperature TA, and thus there is no need for always setting the set temperature Ts2 to be approximately equal to the set temperature Ts. Thus air conditioners suitable for the present embodiment are not limited to air conditioner types that include a temperature measurer capable of measuring the indoor temperature T1 of the room S, and this lack of limitation is advantageous in that many types of air conditioners are suitable for the present embodiment.

Further, the connecting device 400 estimates the indoor temperature upper limit Tth(H) and the indoor temperature lower limit Tth(L) by use of the indoor temperature T2 measured by the temperature measuring device 500 installed in the vicinity of the air conditioning control device 300, and this configuration enables more accurate estimation of the indoor temperature upper limit Tth(H), the indoor temperature lower limit Tth(L), and the set temperature Ts by the air conditioning control device 300.

The controller 470 of the air conditioning system of the present embodiment estimates the set temperature Ts and the allowance range ΔT1 of the air conditioning control device 300 on the basis of the indoor temperature T2 when the ON-OFF state of the switch SWY1 (switch SWY2) or the switch SWW1 (switch SWW2) is switched.

The controller 470 by this means communicates with the air conditioning control device 300, so that there is no need for receiving from the air conditioning control device 300 information indicating the set temperature Ts and the allowance range ΔT1, and thus this configuration enables the use of an air conditioning control device 300 that does not have an information communication function.

In a fixed time interval, the connecting device 400 of the air conditioning system of the present embodiment acquires the intake temperature TA and the indoor temperature T2, calculates the set temperature Ts2 on the basis of the estimate set temperature Tss, the acquired intake temperature TA, and the indoor temperature T2, and transmits the calculated set temperature Ts2 to the outdoor unit 200. This configuration enables the controller 240 of the outdoor unit 200, at each time the set temperature Ts2 is received, to update the rotation speed of the compressor 220 to the rotation speed optimized in response to the received set temperature Ts2. Thus efficiency of the compressor 220 can be improved.

Figure 14:
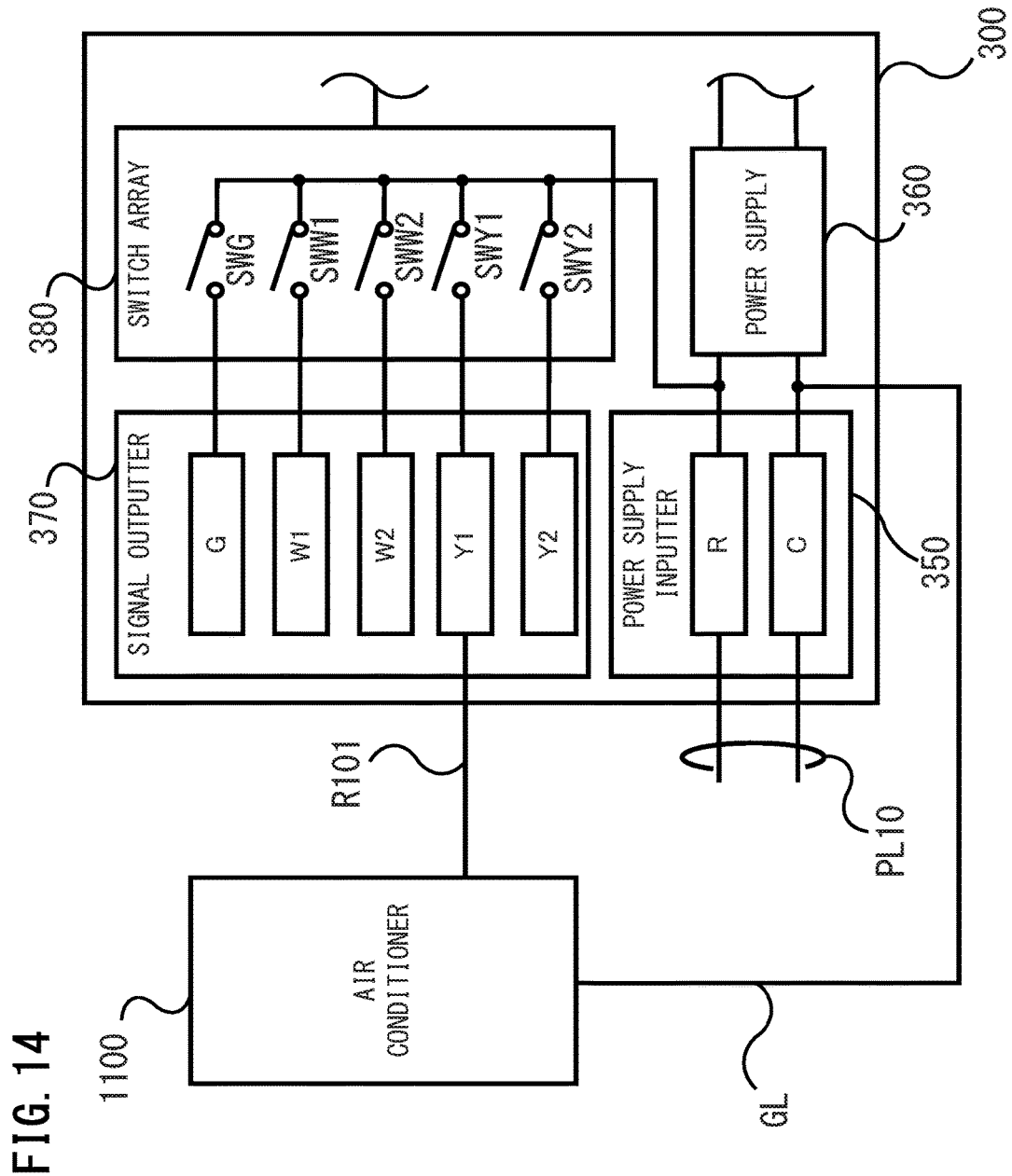
FIG. 14 is a drawing illustrating an example of connection between an air conditioner and an air conditioning control device in a comparative example of the present embodiment.

An air conditioning system of a comparative example can be cited that is configured, as illustrated in FIG. 14, for connection of the air conditioning control device 300 to an air conditioner 1100 that is not equipped with an inverter. In this configuration, a signal line R101 of the air conditioner 1100 is electrically connected to the Y1 terminal of the signal outputter 370, and the ground line GL of the air conditioner 1100 is electrically connected to the C terminal (common terminal) of the power supply inputter 350.

Figure 15:
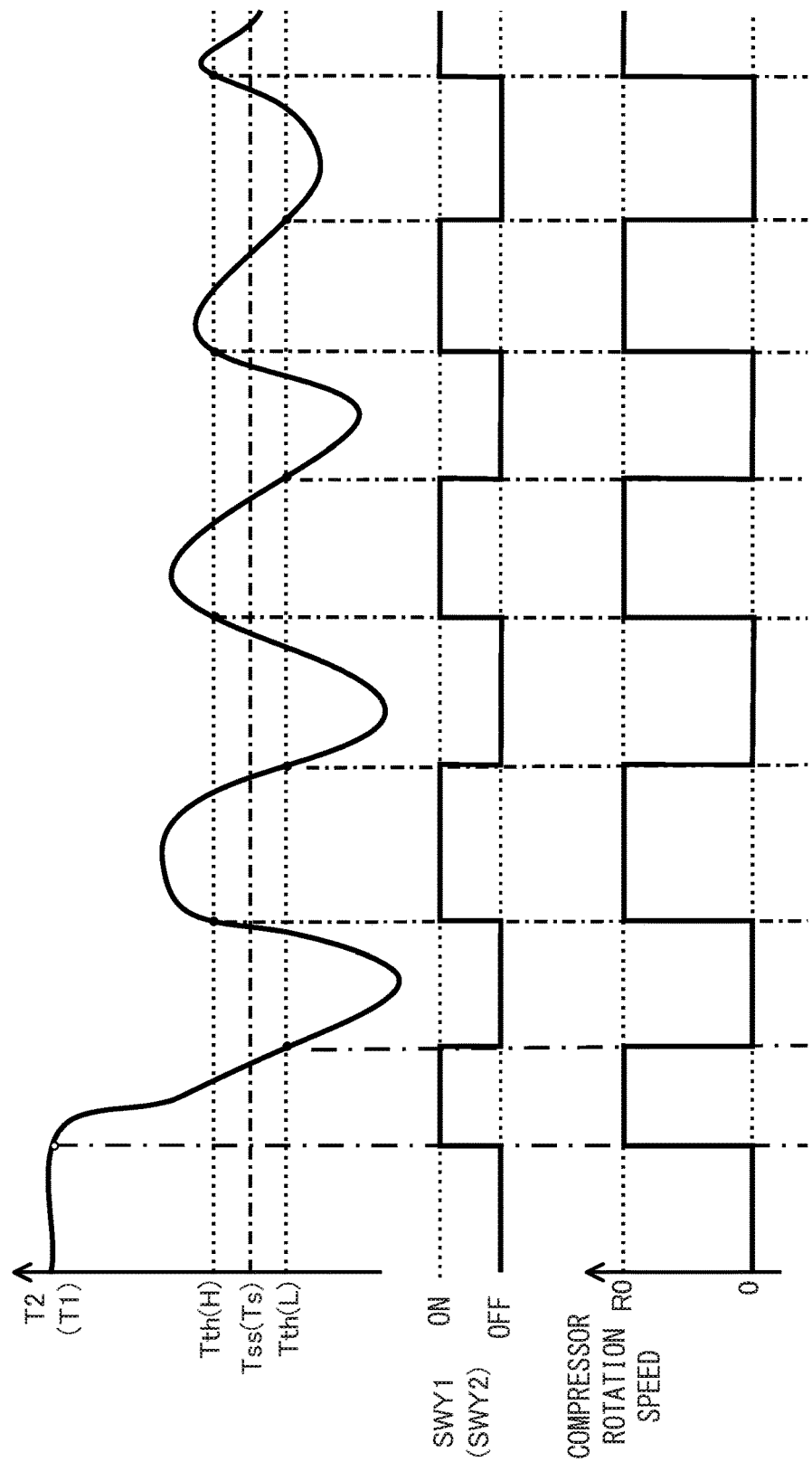
FIG. 15 is a timing chart illustrating relationships between the indoor temperature, switching and compressor rotation speed when the air conditioner of the comparative example of the present embodiment is operating in the cooling mode.

As illustrated in FIG. 15, the compressor 220 in this comparative example, in response to the ON-OFF status of the switch SWY1 (switch SWY2) of the air conditioning control device 300, repeatedly operates at a fixed rotation speed R0 and stops. Therefore as illustrated in FIG. 15, the fluctuations of indoor temperature T1 are great, and time is required for stabilization of the indoor temperature T1, in comparison to the air conditioner control system of the present embodiment.

In contrast, the connecting device 400 of the air conditioning system of the present embodiment appropriately updates the set temperature Ts2 in response to the periodically calculated indoor temperature difference ΔT2. Further, the controller 240, on the basis of the intake temperature TA and the set temperature Ts2, causes a change of the rotation speed of the compressor 220. That is to say, for each updating of the set temperature Ts2, the controller 240 updates the rotation speed of the compressor 220 to an optimum rotation speed in response to the updated set temperature Ts2. This configuration enables stabilization of the indoor temperature T2 (T1) in a relatively short time period.

The connecting device 400 of the air conditioner control system of the present embodiment is taken to sense the OFF status of the switch SWY1 (switch SWY2) or the switch SWW1 (switch SWW2) after stabilization of the indoor temperature T2. At this time, the connecting device 400 compares the estimate allowance range ΔT2 and the absolute value of the difference between the indoor temperature T2 and the indoor temperature lower limit Tth(L) or the indoor temperature upper limit Tth(H) already stored in the memory 480. Thereafter, when the absolute value of the difference is greater than or equal to the estimate allowance range ΔTth, the connecting device 400 estimates the new indoor temperature lower limit Tth(L) or the indoor temperature upper limit Tth(H) to be the acquired indoor temperature T2, and again estimates the estimate set temperature Tss. By this means, even in the case of updating the set temperature Ts by the air conditioning control device 300 after stabilization of the indoor temperature T2, this updating can be sensed, and the estimate set temperature Tss can be newly estimated. Further, this configuration enables distinction between (in the case of the absolute value of the difference being smaller than the estimate allowance range ΔT2) the fluctuations of indoor temperature T2 being caused by changes in the temperature environment of the room, and (in the case of the absolute value of the difference being larger than or equal to the estimate allowance range ΔT2) the fluctuations of indoor temperature T2 being caused by updating of the set temperature Ts at the air conditioning control device 300.

Further, when air conditioner control system of the present embodiment stabilizes the indoor temperature T2, the set temperature Ts2 is calculated, by adding the estimate allowance range ΔT2 to the intake temperature TA, or by subtracting the estimate allowance range ΔT2 from the intake temperature TA, and then the calculated set temperature Ts2 is transmitted to the outdoor unit 200. This configuration enables simplification of the processing of calculation of the set temperature Ts2, thereby enabling a reduction in processing load of the controller 470.

When the air conditioning system of the present embodiment stabilizes the indoor temperature T2, the connecting device 400 stops the acquisition of the intake temperature TA and the indoor temperature T2 at a fixed time interval. Thus after stabilization of the indoor temperature T2, the processing load of the controller 470 can be reduced.

Further, at a time after the passage of a fixed determination standard time after the indoor temperature difference ΔT2 absolute value |ΔT2| is within a fixed value, the controller 470 determines that the indoor temperature T2 is stabilized. This configuration enables relatively easy updating of the standard for determination of stabilization.

Although embodiments of the present description are described above, the present description is not limited by the embodiments.

Figure 16:
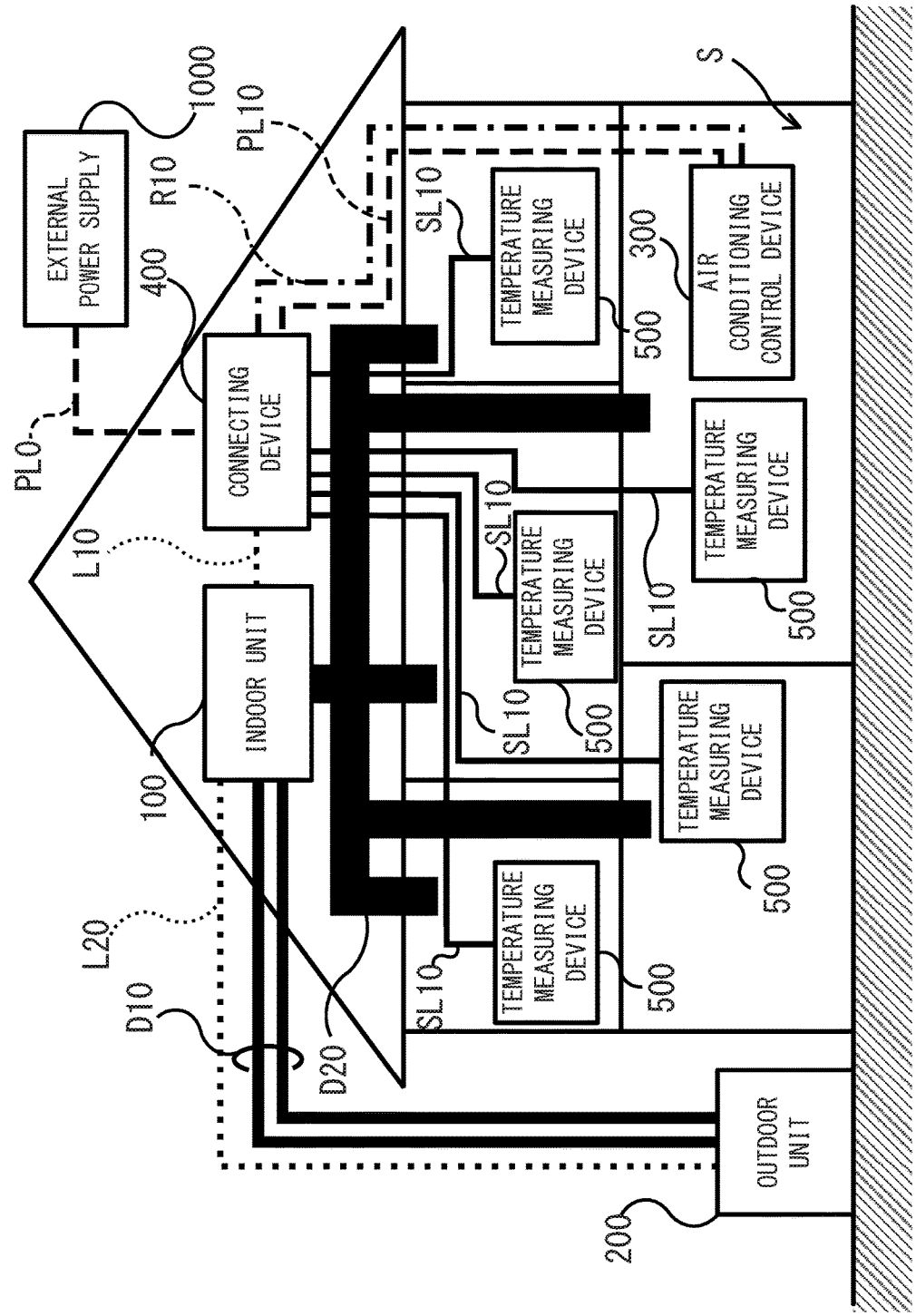
FIG. 16 is a schematic configuration drawing of an air conditioner control system of a modified example of the present embodiment.

In the case of a building that has a plurality of rooms, for example, as illustrated in FIG. 16, a plurality of temperature measuring devices 500 may be installed in respective rooms, and the controller 470 in the present embodiment may estimate the estimate set temperature Tss and the estimate allowance range ΔTth on the basis of the indoor temperatures acquired from each of the temperature measuring devices 500. In this case, the controller 470, for example, may use a mean value of the indoor temperatures acquired from each of the temperature measuring devices 500.

In the case of a building that has a plurality of rooms, this configuration enables control of operation of the air conditioner while taking into account the indoor temperatures of all of the plurality of rooms.

Further, the controller 470 in the above modified example may use the median of the plurality of indoor temperatures T2 acquired from each of the temperature measuring devices 500. Further, a temperature measuring device 500 corresponding to an indoor temperature T2 that greatly deviates from the median of the plurality of indoor temperatures T2 may be excluded from indoor temperature T2 acquisition. For example, an indoor temperature T2 acquired from the temperature measuring device 500 installed in a room that is not the subject of air conditioning may deviate greatly from the median.

Figure 17:
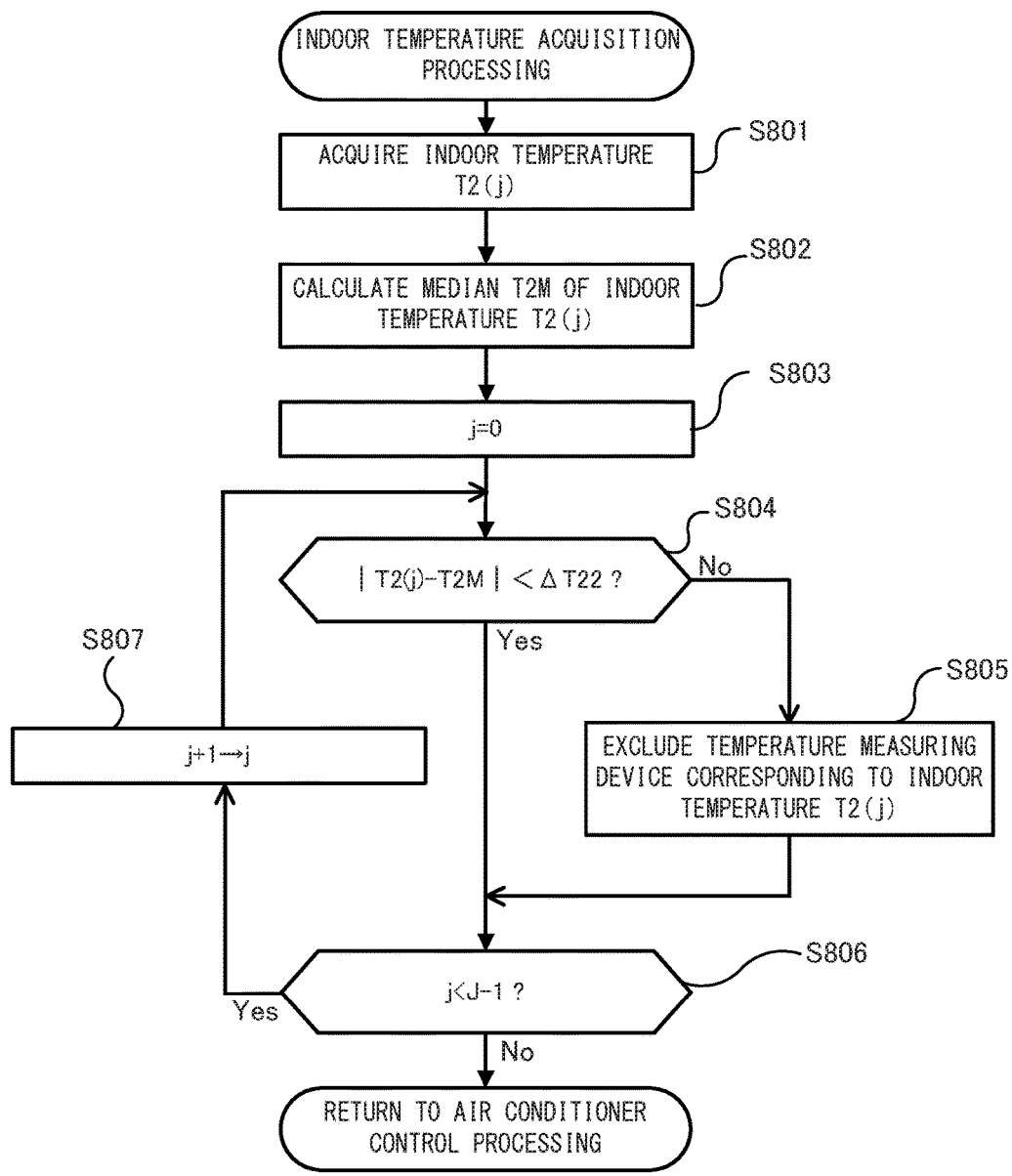
FIG. 17 is a flowchart illustrating an example of indoor temperature acquisition processing of the modified example of the present embodiment.

The indoor temperature acquisition processing of the controller 470 of the connecting device 400 of the present modified example is described below in reference to FIG. 17. Here as illustrated in FIG. 16, the building is taken to have 5 rooms, and temperature measuring devices 500 are taken to be installed in each of the 5 rooms. Firstly, the controller 470 acquires the indoor temperature T2(j) (j=0, 1, . . . , 4) from each of the temperature measuring devices 500 (step S801). The controller 470 uses the identification number j to manage each of the plurality of temperature measurement devices 500 that are subject to the acquisition of the indoor temperature T2(j). The controller 470 associates the identification number j with the acquired indoor temperature T2(j). Thereafter, the controller 470 calculates the median T2M of the acquired indoor temperatures T2(j) (step S802). Thereafter, the controller 470 identifies the indoor temperature T2(0) acquired from the temperature measurement device 500 for which the identification number j is "0" (step S803). Thereafter, the controller 470 determines whether an absolute value of the difference between the identified indoor temperature T2(j) and the median T2M is smaller than a difference absolute value threshold ΔT22 (step S804). The difference absolute value threshold ΔT22, for example, can be set on the basis of an empirical rule for the temperature difference between an room subject to air conditioning and a room not subject to air conditioning.

When the determination in step S804 is that the aforementioned absolute value of the difference is greater than or equal to the threshold ΔT22 (NO in step S804), then the controller 470 excludes the temperature measuring device 500 corresponding to the identified indoor temperature T2(j) from the subjects for acquisition of the indoor temperature T2 (step S805). Thereafter, the controller 470 determines whether the identification number j is smaller than a value (J−1) that is the total number J of the temperature measuring devices 500 minus one (step S806). On the other hand, when the determination in step S804 is that the aforementioned absolute value of the difference is less than the threshold ΔT22 (YES in step S804), then the controller 470 performs the processing of step S806 directly without other processing. When the identification number j in step S806 is less than (J−1) (YES in step S806), the controller 470 increments the identification number j by one (step S807), and again performs the processing of step S804. On the other hand, when the identification number j in step S806 is greater than or equal to (J−1) (NO in step S806), processing returns to air conditioner control processing.

This configuration enables the temperature measuring device 500 installed in a room and the like not subject to air conditioning to be removed from the subjects of acquisition of the indoor temperature T2, and this enables accurate performance of air conditioning in the rooms and the like that are subject to air conditioning.

For example, in the air conditioner control processing of the present embodiment, the controller 470 may be made to periodically update the set temperature Ts2 even after determination that the indoor temperature T2 is stable.

Part of the air conditioner control processing of the controller 470 of the connecting device 400 of the present modified example is described below in reference to FIG. 18. Here, a case is described in which the controller 470 operates the air conditioner in the cooling mode. Further, processing in FIG. 18 that is the same as processing indicated in FIG. 9 is assigned the same reference sign.

The controller 470 performs the processing of step S201 to step S226 illustrated in FIG. 6 and FIG. 8. Further, upon determination that there is prior arrival of the stability determination time (step S221 or step S225 in FIG. 8), the controller 470 performs the processing of step S601 illustrated in FIG. 18. When the determination in step S601 is that there is prior arrival of the set temperature update time (YES in step S601), the controller 470 acquires the indoor temperature T2 (step S615). Thereafter, the controller 470 subtracts the acquired indoor temperature from the estimate set temperature Tss to calculate the indoor temperature difference ΔT2 (step S616).

Figure 19:
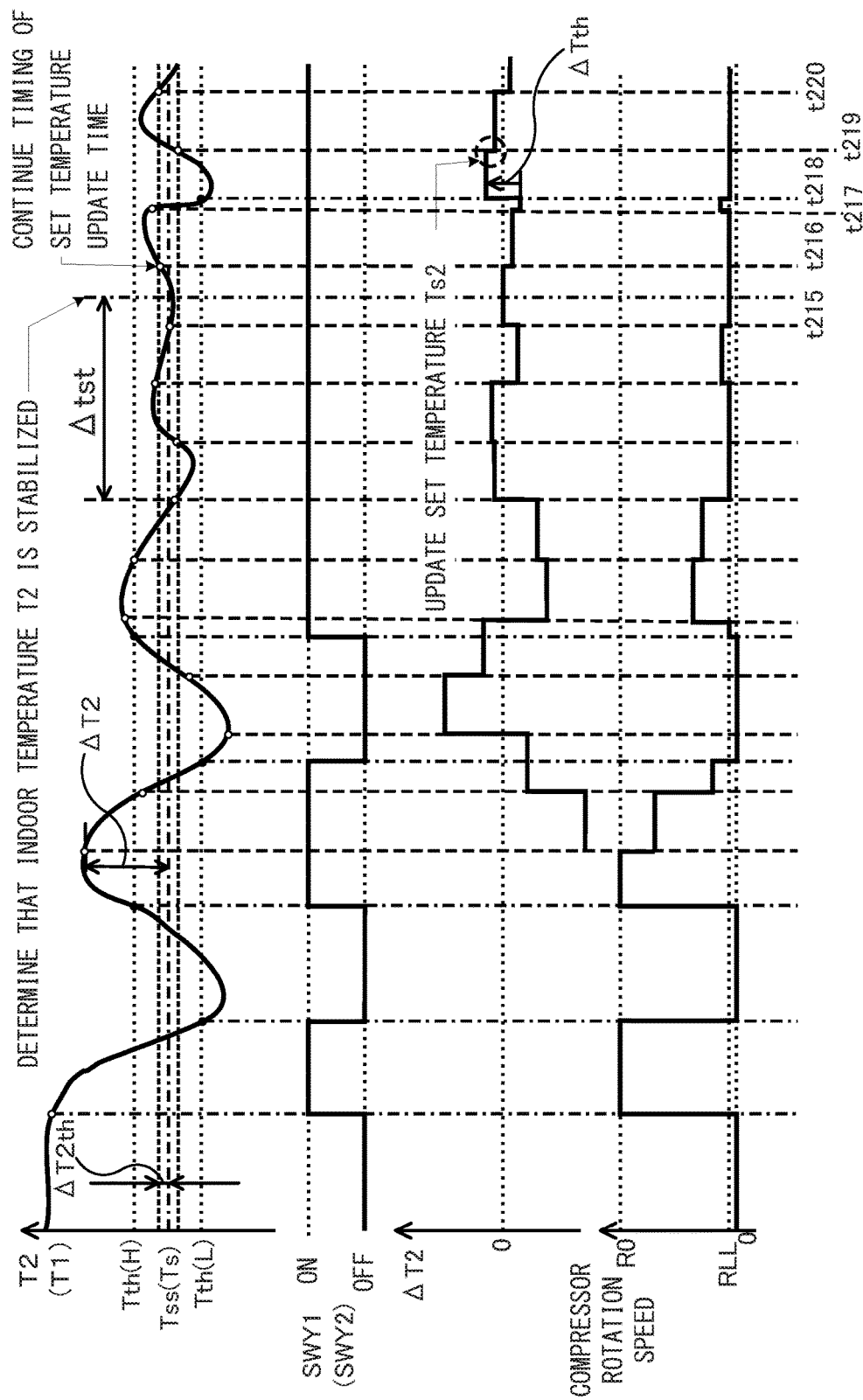
FIG. 19 is a timing chart illustrating relationships between the indoor temperature, switching, indoor temperature difference and compressor rotation speed when the air conditioner of the modified example of the present embodiment is operating in the cooling mode.

Thereafter, the controller 470 acquires the intake temperature TA from the indoor unit 100 (step S617). Thereafter, the controller 470 adds the indoor temperature difference ΔT2 and the acquired intake temperature TA to calculate the set temperature Ts2 (step S618). Thereafter, the controller 470 transmits the calculated set temperature Ts2 to the indoor unit 100 (step S619), and again performs the processing of step S601. As illustrated in FIG. 19, at a time t215 when there is determined to be a prior arrival of the stability determination time, the controller 470 continues the timing of the set temperature update time. For each arrival of the set temperature update time (for example, at times t216, t217, t218, and t219), the set temperature Ts2 is transmitted from the controller 470 to the outdoor unit 200.

On the other hand, when the determination in step S601 is that there is no prior arrival of the set temperature update time (NO in step S601), the controller 470 performs the processing from step S302 to S314. As illustrated in FIG. 19, the indoor temperature T1 (T2), due to change of the temperature environment of the rooms, is taken at the time t218 to be below a temperature (indoor temperature lower limit Tth(L)) that is the set temperature Ts minus the allowance range ΔT1. In this case, the controller 390 of the air conditioning control device 300 turns the switch SWY1 (switch SWY2) OFF. Thereafter, the controller 470 updates the set temperature Ts2 to the value obtained by adding the estimate allowance range ΔTth to the acquired intake temperature TA.

Due to this configuration, even after stabilization of the indoor temperature T2, the controller 470 periodically sends to the outdoor unit 200 an optimal set temperature Ts2 on the basis of the indoor temperature difference ΔT2. Thereafter, for each receiving of the set temperature Ts2, the controller 240 suitably updates the rotation speed of the compressor 220 to a rotation speed corresponding to the received set temperature Ts2. By this means, the controller 240 is able to cause relatively efficient operation of the compressor 220 even after stabilization of the indoor temperature T2, thereby enabling a lowering of power consumption by the compressor 220.

Figure 18:
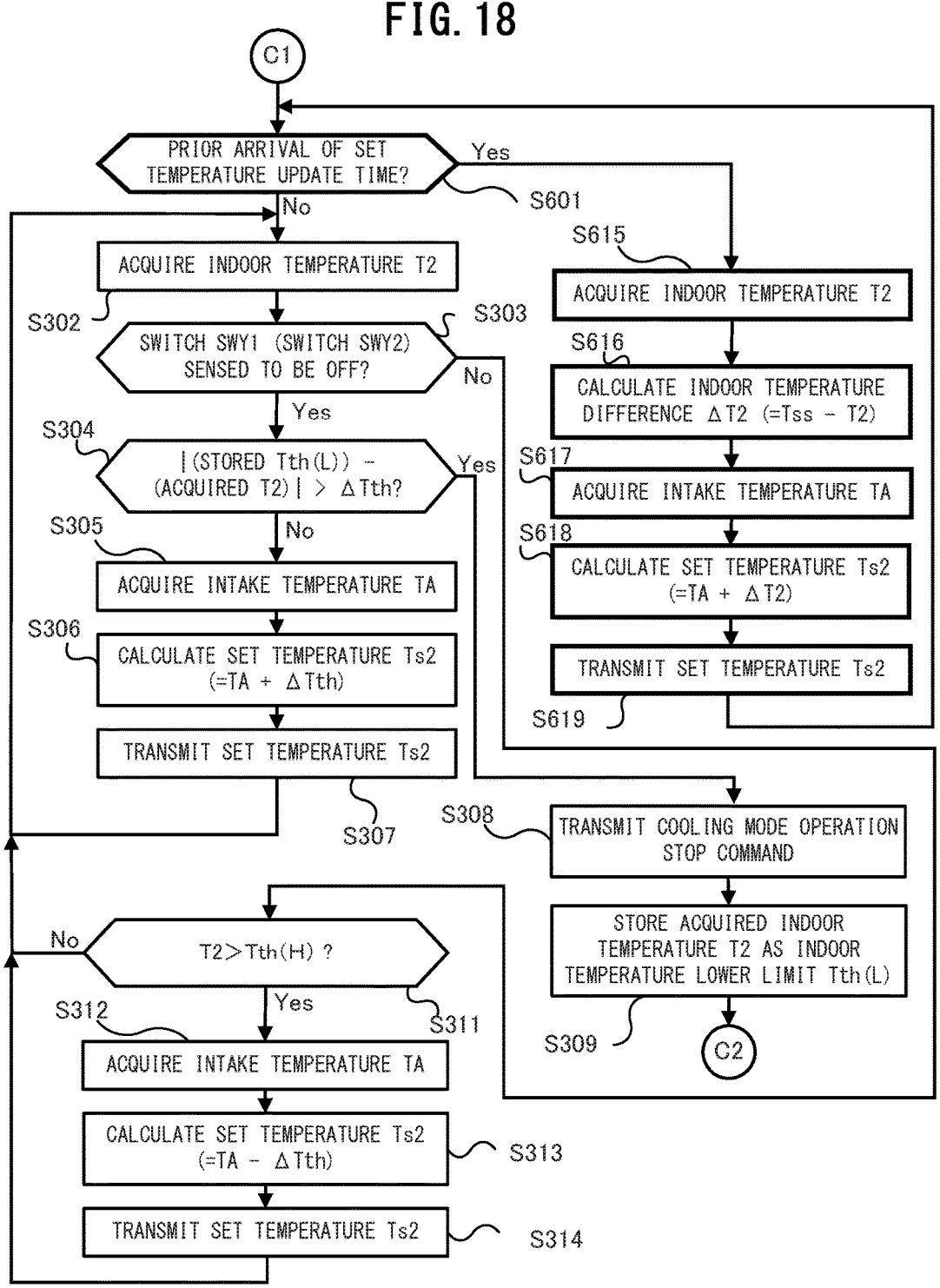
FIG. 18 is a flowchart illustrating the example of the air conditioning control processing when the air conditioner of the modified example of the present embodiment is operated in the cooling mode.

Further, in the air conditioner control processing of a modified example described in reference to FIG. 18, the air conditioner operates in the cooling mode, and when the indoor temperature T2 is lower than the indoor temperature lower limit Tth(L) after determination of stabilization of the indoor temperature T2, the controller 470 may immediately cause a stop of operation of the air conditioner. Alternatively, in the air conditioner control processing of a modified example described in reference to FIG. 18, the air conditioner operates in the heating mode, and when the indoor temperature T2 is lower than the indoor temperature lower limit Tth(L) after determination of stabilization of the indoor temperature T2, the controller 470 may immediately cause a stop of operation of the air conditioner.

Part of the air conditioner control processing of the controller 470 of the connecting device 400 of the present modified example is described below in reference to FIG. 20. Here, a case is described in which the controller 470 operates the air conditioner in the cooling mode. Further, processing in FIG. 20 that is the same as processing indicated in FIG. 9 and FIG. 18 is assigned the same reference sign. The controller 470 performs the processing of step S201 to step S226 illustrated in FIG. 6 and FIG. 8. Further, upon determination that there is prior arrival of the stability determination time (step S221 or step S225 in FIG. 8), the controller 470 performs the processing of step S601 illustrated in FIG. 18.

Figure 20:
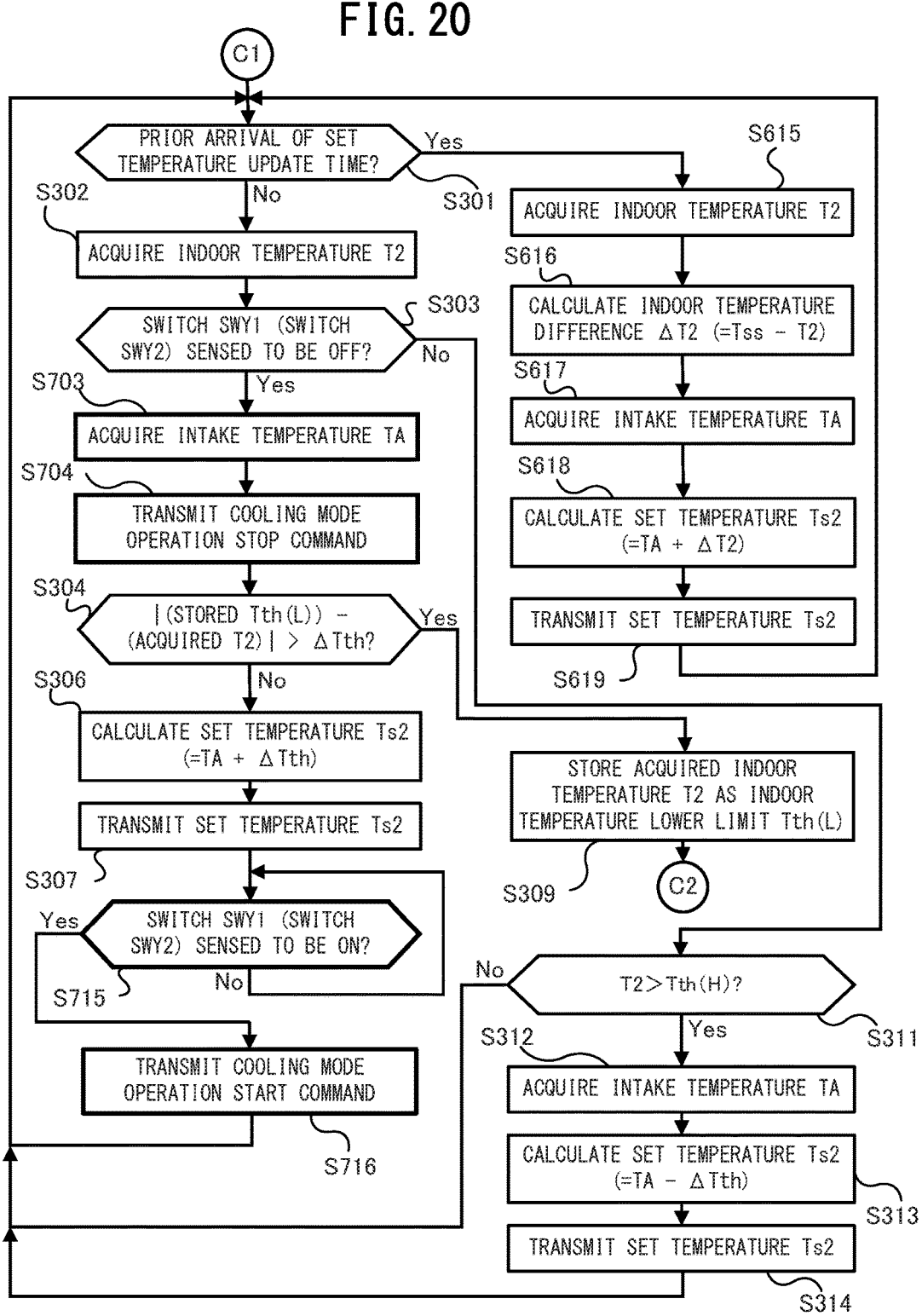
FIG. 20 is a flowchart illustrating the example of the air conditioning control processing flow when the air conditioner of the modified example of the present embodiment is operated in the cooling mode.
Figure 21:
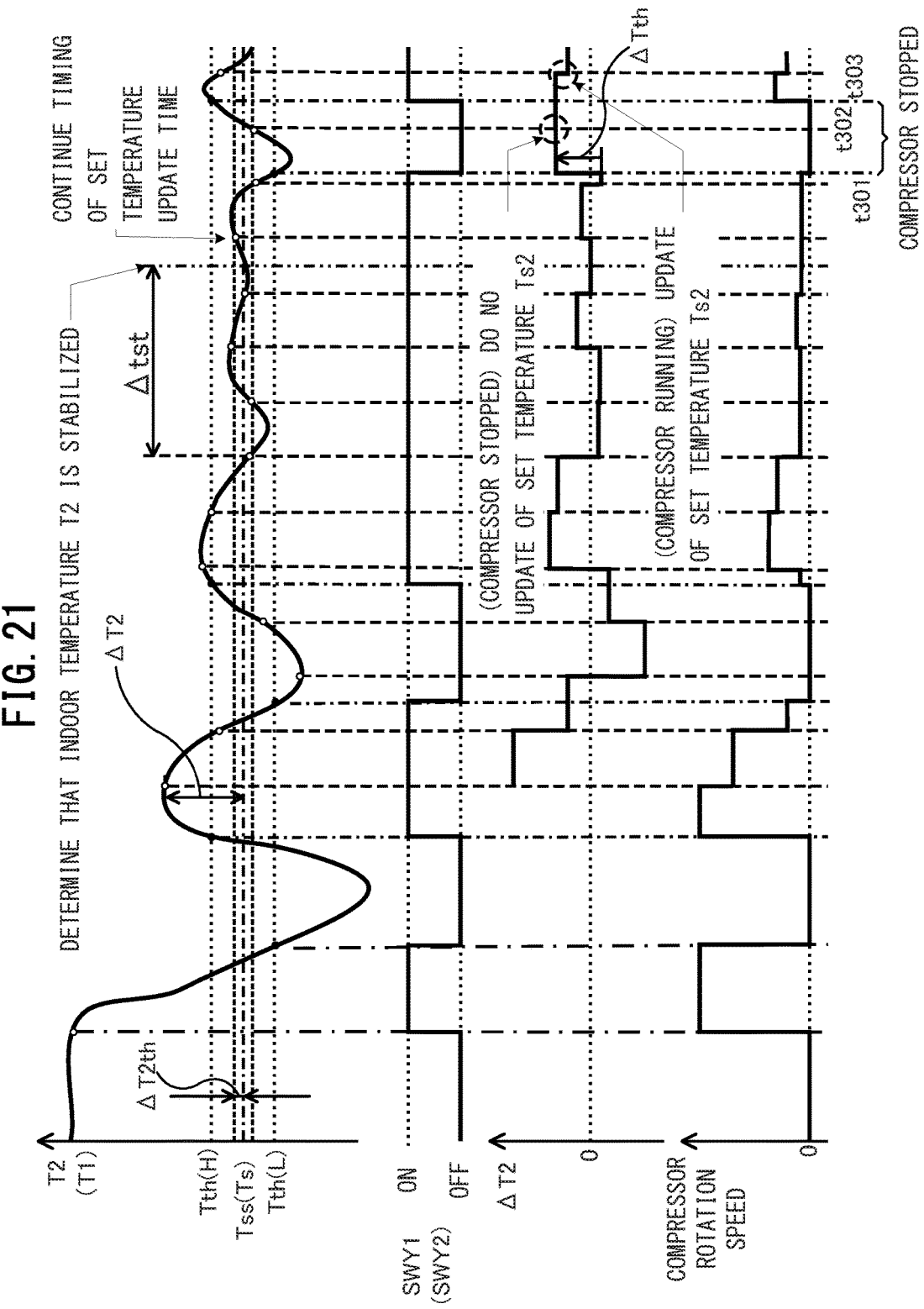
FIG. 21 is a timing chart illustrating relationships between the indoor temperature, switching, indoor temperature difference and compressor rotation speed when the air conditioner of the modified example of the present embodiment is operating in the cooling mode.

Thereafter, as illustrated in FIG. 20, the controller 470 acquires the indoor temperature T2 (step S302), and then determines whether the switch SWY1 (switch SWY2) is sensed to be OFF (step S303). When the switch SWY1 (switch SWY2) is not detected to be OFF in the step S303 (NO in step S303), the controller 470 performs the processing of step S311. On the other hand, when the switch SWY1 (switch SWY2) is detected to be OFF in the step S303 (YES in step S303), the controller 470 acquires the intake temperature TA from the indoor unit 100 (step S703). Thereafter, the controller 470 sends the cooling mode operation stop command to the indoor unit 100 (step S704). As illustrated in FIG. 21, at a time t301 after determination of stability of the indoor air temperature T2, when the indoor temperature T1 (T2), for example, due to change of the temperature environment of the rooms, is lower than a temperature (indoor temperature lower limit Tth(L)) that is the set temperature Ts minus the allowance range ΔT1, the controller 390 of the air conditioning control device 300 turns the switch SWY1 (switch SWY2) OFF. Thereafter, the cooling mode operation stop command from the controller 470 is input to the outdoor unit 200 (step S704), and the controller 240 causes the compressor 220 to stop.

Again in reference to FIG. 20, the controller 470 thereafter determines whether the absolute value of the difference between the indoor temperature lower limit Tth(L) stored in the memory 480 and the acquired indoor temperature T2 is larger than the estimate allowance range ΔTth (step S304). When the determination is that the absolute value of the difference is larger than the estimate allowance range ΔTth (YES in step S304), the controller 470 causes the acquired indoor temperature T2, as the indoor temperature lower limit Tth(L), to be stored in the memory 480 (step S309), and then performs the processing of step S206 of FIG. 6. On the other hand, when the determination is that the absolute value of the difference is less than or equal to the estimate allowance range ΔTth (NO in step S304), the controller 470 calculates the set temperature Ts2 (step S306), and transmits the calculated set temperature Ts2 to the indoor unit 100 (step S307). Thereafter, the controller 470 determines whether the switch SWY1 (switch SWY2) is sensed to be ON (step S715). Here, the controller 470 maintains a wait state as long as the switch SWY1 (switch SWY2) is not sensed to be ON (NO in step S715). Further, in the wait state, even when the set temperature update time arrives, the controller 470 does not update the set temperature Ts2. As illustrated in FIG. 21, at a time t302, the set temperature Ts2 is not updated even though the set temperature update time arrives.

When the switch SWY1 (switch SWY2) in step S715 is sensed to be ON (YES in step S715), the controller 470 transmits the cooling mode operation start command to the indoor unit 100 (step S716), and thereafter again performs the processing of step S301. As illustrated in FIG. 21, at a time t303 after determination of stability of the indoor air temperature T2, when the indoor temperature T1 (T2), is higher than a temperature (indoor temperature upper limit Tth(H)) that is the set temperature Ts plus the allowance range ΔT1, the controller 390 of the air conditioning control device 300 turns the switch SWY1 (switch SWY2) ON. Thereafter, the cooling mode operation start command from the controller 470 is input to the outdoor unit 200, and the controller 240 again causes the compressor 220 to operate.

By this configuration, the controller 240 appropriately causes the compressor 220 to stop after determination that the indoor temperature T2 is stable. By this means power consumption by the compressor 220 can be reduced.

Further, in the present embodiment, the outdoor unit 200 may include a (non-illustrated) outdoor air temperature measurer that measures an outdoor air temperature Tout and also transmits to the connecting device 400 information indicating the measured outdoor air temperature Tout. Here, the outdoor air temperature measurer transmits the outdoor air temperature Tout to the connecting device 400, for example, through the communication interface 260, the communication line L10, the communication interface 130, and the communication line L20. Thereafter, the controller 470 may calculate a correction coefficient for the rotation speed of the compressor 220 on the basis of an absolute value |Tout−TA| of the temperature difference between the outdoor air temperature Tout received from the outdoor unit 200 and the intake temperature TA received from the indoor unit 100, and may transmit the correction coefficient to the outdoor unit 200.

For example, the rotation speed of the compressor 220 is taken to be R, a formula to calculate the rotation speed of the compressor 220 on the basis of the set temperature Ts2 is taken to be f(Ts2), and the correction coefficient based on the absolute value |Tout−TA| of the temperature difference between the outdoor air temperature Tout and the intake temperature TA is taken to be C1(|Tout−TA|). In this case, a functional relationship may be established such as that of the below Formula (1).

$$R = C1(|Tout-TA|) \times f(Ts2) \qquad \text{Formula (1)}$$

Here, dependency of the correction coefficient C(|Tout−TA|), for example, becomes smaller with increase of the absolute value |Tout−TA| of the temperature difference between the outdoor air temperature Tout and the intake temperature TA of the indoor unit 100.

Further, the correction coefficient C1(|Tout−TA|) may be stored, for example, in the memory 480, and may be determined on the basis of a (non-illustrated) lookup table that indicates the relationship between the correction coefficient C1(|Tout−TA|) and the absolute value |Tout−TA| of the temperature difference.

Further, the controller 470 may transmit to the outdoor unit 200 the correction coefficient of the rotation speed of the compressor 220, for example, together with the set temperature Ts2, in the step S218 of air conditioner control processing illustrated in FIG. 8 or FIG. 12.

However, even though the flow rate of coolant flowing through the refrigerant pipe D10 is the same, when the absolute value of the temperature difference between the periphery temperature (outdoor air temperature Tout) of the heat exchanger 210 and the periphery temperature (intake temperature TA) of the heat exchanger 110 is different, the strength of cooling or the strength of heating is different. For example, when the absolute value of the temperature difference between the intake temperature TA and the outdoor air temperature Tout is relatively large, sufficient cooling strength or heating strength is obtained even through the flow rate of the coolant is relatively small.

In response, the controller 240 of the present configuration uses the correction coefficient received from the connecting device 400 and based on the absolute value of the temperature difference between the outdoor air temperature Tout and the intake temperature TA, and sets the rotation speed of the compressor 220. Thus when the absolute value of the temperature difference between the intake temperature TA and the outdoor air temperature Tout is relatively large, the controller 240 sets the rotation speed of the compressor 220 at a relatively low rotation speed. By this means, the rotation speed of the compressor 220 is set relatively low on the basis of the absolute value of the temperature difference between the intake temperature TA and the outdoor air temperature Tout, and thus power consumption of the compressor 220 can be decreased.

In the present embodiment, for example, the power supply 360, rather than supplying DC power just to the controller 390, may also supply DC power to the display 320 and the memory 340.

In the present embodiment, the communication interface 450 may connect directly through a communication line to the communication interface 260 of the outdoor unit 200.

In the present embodiment, the power supply 460 may be configured to receive the supply of AC power from a component other than the power supply inputter 430. For example, when the communication interface 450 is provided with a power supply line, the power supply 460 may receive AC power from the power supply line provided for the communication interface 450.

In the present embodiment, the set temperature memory 250 that stores the set temperature Ts2 may be included in the indoor unit 100. Alternatively, the set temperature memory 250 may be provided for both the indoor unit 100 and the outdoor unit 200. Further, the initial value of the set temperature Ts2, for example, can be set by an air conditioner remote controller that is not the air conditioning control device 300.

Further, the air conditioning control device 300 or connecting device 400 of the present description can be realized by use of a general computer system rather than a dedicated system. For example, the air conditioning control device 300 or the connecting device 400 for executing the aforementioned processing can be configured by storing and distributing on a computer system-readable non-temporary recording medium (such as a CD-ROM) a program for executing the aforementioned operations by a computer connected to a network, and by installing the program on the computer system.

Further, any desired method may be used for supplying the program to the computer. For example, the computer program may be uploaded to a bulletin board system (BBS) of a communication network, and may be distributed through the communication network to the computer. Thereafter, the computer starts the program, and under control of an OS, executes the program in the same manner as other applications. The computer by this means functions as the air conditioning control device 300 or the connecting device 400 that executes the aforementioned processing.

The present disclosure can be embodied in various ways and can undergo various modifications without departing from the broad spirit and scope of the disclosure. Moreover, the embodiment described above is for explaining the present disclosure, and does not limit the scope of the present disclosure. In other words, the scope of the present disclosure is as set forth in the Claims and not the embodiment. Various changes and modifications that are within the scope disclosed in the claims or that are within a scope that is equivalent to the claims of the disclosure are also included within the scope of the present disclosure.

INDUSTRIAL APPLICABILITY

The present disclosure can be used with advantage for an air conditioner control system, a connecting device, an air conditioner control method, and the like that uses an air conditioning method that installs an air conditioner below a floor, above a ceiling, outdoors, and the like, and that sends air through ducts to various rooms.

REFERENCE SIGNS LIST

100 Indoor unit
110 Heat exchanger
120 Temperature measurer
130, 260, 450 Communication interface
200 Outdoor unit
210 Heat exchanger
220 Compressor
230 Flow direction changer
240, 390, 470 Controller
250 Set temperature memory
300 Air conditioning control device
310 Operation unit
320 Display
330 Temperature measurer
340, 480 Memory
350, 430 Power supply inputter
360, 460 Power supply
370 Signal outputter
380 Switch array
400 Connecting device
410 Signal inputter
420 Power supply outputter
440 Temperature inputter
500 Temperature measuring device
1000 External power supply
D10 Refrigerant pipe
D20 Duct
L10, L20, L30 Communication line
PL0, PL10 Power supply line
R10, SL10 Signal line

The invention claimed is:

1. An air conditioner control system comprising:
an air conditioner comprising a temperature measurer configured to measure a first air temperature of a space where an indoor unit is installed, the air conditioner being configured to perform, based on the measured first air temperature and a stored first set temperature, air conditioning of an air conditioning space that is subject to air conditioning by sending air to the air conditioning space through a duct from the indoor unit;

an air conditioning control device comprising a temperature measurer configured to measure a second air temperature of the air conditioning space, and a controller configured to switch between an ON state and an OFF state of a signal output based on the measured second air temperature and a user set temperature set by a user;

a temperature measuring device configured to measure a third air temperature of the air conditioning space; and a connecting device configured to communicably connect to the air conditioner, connect through a signal line to the air conditioning control device, and connect to the temperature measuring device, wherein the connecting device is further configured to:
estimate the user set temperature based on an ON-OFF state of the signal output of the air conditioning control device sensed through the signal line, and the third air temperature acquired from the temperature measuring device, and calculate a second set temperature based on the first air temperature acquired from the air conditioner and a temperature difference between the estimated user set temperature and the third air temperature acquired from the temperature measuring device, and transmit the calculated second set temperature to the air conditioner, and wherein the air conditioner is further configured to update the first set temperature to the second set temperature received from the connecting device.

2. The air conditioner control system according to claim 1, wherein
the controller of the air conditioning control device, when the air conditioner operates in a cooling mode, is further configured to:
when the signal output is in the ON state, switch the signal output to the OFF state when the second air temperature changes from a temperature higher than an air temperature lower limit that is the user set temperature minus a first allowance range to a temperature lower than the air temperature lower limit; and when the signal output is in the OFF state, switch the signal output to the ON state when the second air temperature changes from a temperature lower than an air temperature upper limit that is the user set temperature plus the first allowance range to a temperature higher than the air temperature upper limit, and the connecting device is further configured to:
when the signal output of the air conditioning control device is sensed to switch from the ON state to the OFF state, estimate that the third air temperature acquired from the temperature measuring device is the air temperature lower limit;

when the signal output of the air conditioning control device is sensed to switch from the OFF state to the ON state, estimate that the third air temperature acquired from the temperature measuring device is the air temperature upper limit;

estimate that a mean value of the estimated air temperature lower limit and the estimated air temperature upper limit is the user set temperature; and calculate the second set temperature by adding to the first air temperature acquired from the air conditioner a temperature difference obtained by subtracting the third air temperature from the estimated user set temperature.

3. The air conditioner control system according to claim 1, wherein
the controller of the air conditioning control device, when the air conditioner operates in a heating mode, is further configured to:
when the signal output is in the ON state, switch the signal output to the OFF state when the second air temperature changes from a temperature lower than an air temperature upper limit that is the user set temperature plus a second allowance range to a temperature higher than the air temperature upper limit; and when the signal output is in the OFF state, switch the signal output to the ON state when the second air temperature changes from a temperature higher than an air temperature lower limit that is the user set temperature minus the second allowance range to a temperature lower than the air temperature lower limit, and the connecting device is further configured to:
when the signal output of the air conditioning control device is sensed to switch from the ON state to the OFF state, estimate that the third air temperature acquired from the temperature measuring device is the air temperature upper limit;

when the signal output of the air conditioning control device is sensed to switch from the OFF state to the ON state, estimate that the third air temperature acquired from the temperature measuring device is the air temperature lower limit;

estimate that a mean value of the estimated air temperature lower limit and the estimated air temperature upper limit is the user set temperature; and calculate the second set temperature by adding to the first air temperature acquired from the air conditioner a temperature difference obtained by subtracting the third air temperature from the estimated user set temperature.

4. The air conditioner control system according to claim 2, wherein
the controller of the air conditioning control device, when the air conditioner operates in a heating mode, is further configured to:
when the signal output is in the ON state, switch the signal output to the OFF state when the second air temperature changes from a temperature lower than an air temperature upper limit that is the user set temperature plus a second allowance range to a temperature higher than the air temperature upper limit; and when the signal output is in the OFF state, switch the signal output to the ON state when the second air temperature changes from a temperature higher than an air temperature lower limit that is the user set temperature minus the second allowance range to a temperature lower than the air temperature lower limit, and the connecting device is further configured to:
when the signal output of the air conditioning control device is sensed to switch from the ON state to the OFF state, estimate that the third air temperature acquired from the temperature measuring device is the air temperature upper limit;

when the signal output of the air conditioning control device is sensed to switch from the OFF state to the ON state, estimate that the third air temperature acquired from the temperature measuring device is the air temperature lower limit;

estimate that a mean value of the estimated air temperature lower limit and the estimated air temperature upper limit is the user set temperature; and calculate the second set temperature by adding to the first air temperature acquired from the air conditioner a temperature difference obtained by subtracting the third air temperature from the estimated user set temperature.

5. The air conditioner control system according to claim 2, wherein the connecting device is further configured to:

at a fixed time interval, acquire the first air temperature from the air conditioner, and acquire the third air temperature from the temperature measuring device; and for each acquiring of the first air temperature and the third air temperature, calculate the second set temperature based on the estimated user set temperature and the acquired first air temperature and third air temperature, and transmit the calculated second set temperature to the air conditioner.

6. The air conditioner control system according to claim 3, wherein the connecting device is further configured to:

at a fixed time interval, acquire the first air temperature from the air conditioner, and acquire the third air temperature from the temperature measuring device; and for each acquiring of the first air temperature and the third air temperature, calculate the second set temperature based on the estimated user set temperature and the acquired first air temperature and third air temperature, and transmit the calculated second set temperature to the air conditioner.

7. The air conditioner control system according to claim 4, wherein the connecting device is further configured to:

at a fixed time interval, acquire the first air temperature from the air conditioner, and acquire the third air temperature from the temperature measuring device; and for each acquiring of the first air temperature and the third air temperature, calculate the second set temperature based on the estimated user set temperature and the acquired first air temperature and third air temperature, and transmit the calculated second set temperature to the air conditioner.

8. The air conditioner control system according to claim 5, wherein the connecting device, when the air conditioner operates in the cooling mode, is further configured to:

estimate that an absolute value of a temperature difference between the estimated air temperature lower limit and the estimated user set temperature is the first allowance range;

when the third air temperature is determined to be stable, upon sensing that the signal output of the air conditioning control device is in the OFF state, compare the estimated first allowance range with an absolute value of a difference between the third air temperature acquired from the temperature measuring device and the estimated air temperature lower limit;

when the absolute value of the difference is less than the estimated first allowance range, acquire the first air temperature from the air conditioner, calculate the second set temperature by adding the estimated first allowance range to the acquired first air temperature, and transmit the calculated second set temperature to the air conditioner; and when the absolute value of the difference is greater than or equal to the estimated first allowance range, estimate that the acquired third air temperature is the air temperature lower limit, and again estimate the user set temperature.

9. The air conditioner control system according to claim 6, wherein the connecting device, when the air conditioner operates in the cooling mode, is further configured to:

estimate that an absolute value of a temperature difference between the estimated air temperature lower limit and the estimated user set temperature is the first allowance range;

when the third air temperature is determined to be stable, upon sensing that the signal output of the air conditioning control device is in the OFF state, compare the estimated first allowance range with an absolute value of a difference between the third air temperature acquired from the temperature measuring device and the estimated air temperature lower limit;

when the absolute value of the difference is less than the estimated first allowance range, acquire the first air temperature from the air conditioner, calculate the second set temperature by adding the estimated first allowance range to the acquired first air temperature, and transmit the calculated second set temperature to the air conditioner; and when the absolute value of the difference is greater than or equal to the estimated first allowance range, estimate that the acquired third air temperature is the air temperature lower limit, and again estimate the user set temperature.

10. The air conditioner control system according to claim 7, wherein the connecting device, when the air conditioner operates in the cooling mode, is further configured to:

estimate that an absolute value of a temperature difference between the estimated air temperature lower limit and the estimated user set temperature is the first allowance range;

when the third air temperature is determined to be stable, upon sensing that the signal output of the air conditioning control device is in the OFF state, compare the estimated first allowance range with an absolute value of a difference between the third air temperature acquired from the temperature measuring device and the estimated air temperature lower limit;

when the absolute value of the difference is less than the estimated first allowance range, acquire the first air temperature from the air conditioner, calculate the second set temperature by adding the estimated first allowance range to the acquired first air temperature, and transmit the calculated second set temperature to the air conditioner; and when the absolute value of the difference is greater than or equal to the estimated first allowance range, estimate that the acquired third air temperature is the air temperature lower limit, and again estimate the user set temperature.

11. The air conditioner control system according to claim 5, wherein the connecting device, when the air conditioner operates in the heating mode, is further configured to:

estimate that an absolute value of a temperature difference between the estimated air temperature upper limit and the estimated user set temperature is the second allowance range;

when the third air temperature is determined to be stable, upon sensing that the signal output of the air conditioning control device is in the OFF state, compare the estimated second allowance range with an absolute value of a difference between the third air temperature acquired from the temperature measuring device and the air temperature upper limit;

when the absolute value of the difference is less than the estimated second allowance range, acquire the first air temperature from the air conditioner, calculate the second set temperature by subtracting the estimated second allowance range from the acquired first air temperature, and transmit the calculated second set temperature to the air conditioner; and when the absolute value of the difference is greater than or equal to the estimated second allowance range, estimate that the acquired third air temperature is the air temperature upper limit, and again estimate the user set temperature.

12. The air conditioner control system according to claim 8, wherein the connecting device, when the air conditioner operates in the heating mode, is further configured to:

estimate that an absolute value of a temperature difference between the estimated air temperature upper limit and the estimated user set temperature is the second allowance range;

when the third air temperature is determined to be stable, upon sensing that the signal output of the air conditioning control device is in the OFF state, compare the estimated second allowance range with an absolute value of a difference between the third air temperature acquired from the temperature measuring device and the air temperature upper limit;

when the absolute value of the difference is less than the estimated second allowance range, acquire the first air temperature from the air conditioner, calculate the second set temperature by subtracting the estimated second allowance range from the acquired first air temperature, and transmit the calculated second set temperature to the air conditioner; and when the absolute value of the difference is greater than or equal to the estimated second allowance range, estimate that the acquired third air temperature is the air temperature upper limit, and again estimate the user set temperature.

13. The air conditioner control system according to claim 8, wherein the connecting device is further configured to, when the third air temperature is determined to be stable, stop acquiring the first air temperature and the third air temperature at a fixed time interval.

14. The air conditioner control system according to claim 11, wherein the connecting device is further configured to, when the third air temperature is determined to be stable, stop acquiring the first air temperature and the third air temperature at a fixed time interval.

15. The air conditioner control system according to claim 8, wherein the connecting device is further configured to, upon passage of a fixed determination standard time after the absolute value of the difference between the estimated user set temperature and the third air temperature is less than a threshold, determine that the third air temperature is stable.

16. The air conditioner control system according to claim 1, wherein the air conditioner further comprises:

a compressor; and a compressor controller configured to maintain the first air temperature at the first set temperature by, based on a temperature difference between the first air temperature and the first set temperature, changing a rotation speed of the compressor.

17. The air conditioner control system according to claim 1, further comprising temperature measuring devices, wherein the temperature measuring device is one of the temperature measuring devices, wherein the connecting device is further configured to calculate a mean value or a median of temperatures acquired from the temperature measuring devices as the third air temperature.

18. A connecting device configured to:

communicably connect to an air conditioner comprising a temperature measurer configured to measure a first air temperature of a space where an indoor unit is installed, the air conditioner being configured to perform, based on the measured first air temperature and a stored first set temperature, air conditioning of an air conditioning space that is subject to air conditioning by sending air to the air conditioning space through a duct from the indoor unit;

connect through a signal line to an air conditioning control device comprising a temperature measurer configured to measure a second air temperature of the air conditioning space, and a controller configured to switch between an ON state and an OFF state of a signal output based on the measured second air temperature and a user set temperature set by a user; and connect to a temperature measuring device configured to measure a third air temperature of the air conditioning space, and wherein the connecting device is further configured to:

estimate the user set temperature based on an ON-OFF state of the signal output of the air conditioning control device sensed through the signal line, and the third air temperature acquired from the temperature measuring device; and calculate a second set temperature based on the first air temperature acquired from the air conditioner and a temperature difference between the estimated user set temperature and the third air temperature acquired from the temperature measuring device, and transmit the calculated second set temperature to the air conditioner.

19. An air conditioner control method comprising:

by an air conditioner, measuring a first air temperature of a space where an indoor unit is installed, and performing, based on the measured first air temperature and a stored first set temperature, air conditioning of an air conditioning space that is subject to air conditioning by sending air to the air conditioning space through a duct from the indoor unit;

by an air conditioning control device, measuring a second air temperature of the air conditioning space, and switching between an ON state and an OFF state of a signal output based on the measured second air temperature and a user set temperature set by a user;

by a temperature measuring device, measuring a third air temperature of the air conditioning space;

by a connecting device, estimating the user set temperature based on an ON-OFF state of the signal output of the air conditioning control device sensed through a signal line, and the third air temperature acquired from the temperature measuring device, calculating a second set temperature based on the first air temperature acquired from the air conditioner and a temperature difference between the estimated user set temperature and the third air temperature acquired from the temperature measuring device, and transmitting the calculated second set temperature to the air conditioner; and
by the air conditioner, updating the first set temperature to the second set temperature received from the connecting device.

* * * * *